United States Patent
Takada

(10) Patent No.: US 6,189,364 B1
(45) Date of Patent: Feb. 20, 2001

(54) BENDING ANGLE CORRECTION METHOD AND PRESS BRAKE

(75) Inventor: Masaaki Takada, Komatsu (JP)

(73) Assignee: Komatsu Ltd., Tokyo (JP)

( * ) Notice: Under 35 U.S.C. 154(b), the term of this patent shall be extended for 0 days.

(21) Appl. No.: 09/284,772

(22) PCT Filed: Oct. 9, 1997

(86) PCT No.: PCT/JP97/03660

§ 371 Date: Apr. 20, 1999

§ 102(e) Date: Apr. 20, 1999

(87) PCT Pub. No.: WO98/18579

PCT Pub. Date: May 7, 1998

(30) Foreign Application Priority Data

Oct. 29, 1996 (JP) .................................... 8-286327
Oct. 29, 1996 (JP) .................................... 8-286328

(51) Int. Cl.[7] ...................................... B21D 5/02
(52) U.S. Cl. ...................... 72/702; 72/31.1; 72/31.11; 72/389.4; 72/389.5
(58) Field of Search ................... 72/31.1, 31.11, 72/31.12, 389.3, 389.4, 389.5, 702

(56) References Cited

U.S. PATENT DOCUMENTS

| | | | |
|---|---|---|---|
| 5,839,310 | * 11/1998 | Tokai et al. | 72/31.1 |
| 5,842,366 | * 12/1998 | Klingel et al. | 72/31.1 |
| 5,857,366 | * 1/1999 | Koyama | 72/389.5 |
| 5,899,103 | * 5/1999 | Ooenoki et al. | 72/389.5 |
| 6,003,353 | * 12/1999 | Ootani et al. | 72/31.1 |

FOREIGN PATENT DOCUMENTS

| | | | |
|---|---|---|---|
| 2-55622 | * | 2/1990 | (JP) . |
| 2-224821 | * | 9/1990 | (JP) . |
| 4-251614 | * | 9/1992 | (JP) . |
| 5-337554 | * | 12/1993 | (JP) . |
| 6-52218 | * | 3/1994 | (JP) . |
| 5-54416 | * | 7/1994 | (JP) . |
| 7-265957 | * | 10/1995 | (JP) . |
| 7-314042 | * | 12/1995 | (JP) . |
| 8-300048 | * | 11/1996 | (JP) . |

* cited by examiner

Primary Examiner—David Jones
(74) Attorney, Agent, or Firm—Armstrong, Westerman, Hattori, McLeland & Naughton

(57) ABSTRACT

A bend angle correction method directed to carrying out simple and accurate penetration of a movable die into a fixed die to produce a uniform angle throughout the length of a workpiece, being unaffected by material variations. When bending a sheet-like workpiece to a desired angle by the cooperative movement of a movable punch driven by three or more drive shafts and a fixed die disposed in an opposing relationship with the movable die, the bend angle of the workpiece is measured during bending operation and the difference between the measured bend angle and a target angle is obtained, at at least three points which are the ends and center of the workpiece. Based on the differences, correction amounts for the penetration of the movable die are obtained on a shaft-load imposed point basis.

8 Claims, 21 Drawing Sheets

BENDING ANGLE CORRECTION METHOD AND PRESS BRAKE

TECHNICAL FIELD

The present invention relates to a bend angle correction method for correcting the bend angle of a sheet-like workpiece which is bent by the cooperative movement of a movable die (punch) and a fixed die (die). The movable die is supported by a ram having three or more drive shafts, while the fixed die being supported in an opposing relationship with the movable die. The invention also relates to a press brake for use with the above method which provides high accuracy bending.

BACKGROUND ART

As such a conventional bending machine, the press brake 51 shown in FIG. 22 is known. In the press brake 51, a ram 52 and a fixed bed 53 are disposed, facing each other and a pair of side frames 54, 55 are formed so as to be integral with the ends of the fixed bed 53, respectively. Hydraulic cylinders 56, which are positioned on the respective upper ends of the side frames 54, 55, raise or lower the ram 52. Attached to the lower end of the ram 52 is an upper die (punch) 57. Mounted on the upper face of the fixed bed 53 is a lower die (die) 58. A sheet-like workpiece is interposed between these upper and lower dies 57, 58 and pressed with these dies 57, 58 by operating the hydraulic cylinders 56, so that the workpiece can be bent to a desired angle.

When bending a workpiece with such a press brake 51, there will be a difference between bend angles at the center and ends of the workpiece because of the deflections of the ram 52 and the fixed bed 53. This problem is called a "boat form" phenomenon (i.e., a belly of the workpiece at its center). To avoid the boat form phenomenon, a deflection compensating mechanism is provided for the ram or bed in conventional press brakes. Representative examples of the deflection compensating mechanism are a crowning mechanism with wedges as disclosed in Japanese Patent Publication Gazette (KOKAI) No. 2-55622 (1990) and a crowning mechanism with hydraulic cylinders as disclosed in Japanese Patent Publication Gazette (KOKAI) No. 6-55218 (1994).

The present applicant proposes, in Japanese Patent Publication Gazette (KOKAI) No. 7-265957 (1995), a method for producing an accurate bend through one bending operation. According to this publication, the bend angle of a workpiece is measured at a point (provisional punch penetration point) just before a target bend angle during bending operation, and a final punch penetration point is obtained based on this measured value, springback data and a workpiece bend angle to punch penetration relationship. The punch is then driven to the final punch penetration point thereby performing high accuracy bending unaffected by variations in the material of the workpiece.

Japanese Utility Model Publication Gazette (KOKAI) No. 6-54416 (1994) discloses a deflection detector unit for detecting the deflection of the ram in a press brake having three or more drive shafts. According to a detected value of this deflection detector unit, each of the drive shafts is controlled.

In the crowning system with wedges such as disclosed in Japanese Patent Publication No. 2-55622, it is difficult in view of its structure to make alterations to crowning while the workpiece is under pressure. Although crowning can be altered during the application of pressure to the workpiece in the crowning system with hydraulic cylinders as disclosed in Japanese Patent Publication No. 6-55218, a punch penetration amount associated with crowning is not directly controlled but hydraulic pressure alone is controlled. Therefore, a punch penetration amount is obtained from open loop control, so that the punch cannot be correctly penetrated into the die.

In the case of the method of Japanese Patent Publication No. 7-265957, the accuracy of bending is greatly dependent on whether or not the penetration of the punch can be corrected with high accuracy and it is therefore important to accurately control the amount of punch penetration. Even though the method is designed to calculate and feed back a punch penetration amount associated with crowning, it involves complicated control for the following reasons. First, since the shafts which apply pressure to the workpiece differ from the crowning system in terms of mechanism as well as the way of controlling, a corrective punch penetration amount obtained through bend angle measurement should be converted into different control amounts for the shafts and for the crowning system. Secondly, the delay between the control operations of the shafts and the crowning system must be taken into account, which makes the method more complicated.

In the method disclosed in Japanese Utility Model Publication No. 6-54416, angular errors such as a boat-formed belly due to mechanical deflection can be compensated in the course of bending operation. However, even if punch penetration can be correctly performed to produce a uniform desired bend angle throughout the length of the workpiece, it is impossible to overcome bend angle variations due to variations in the properties of the workpiece in its lengthwise direction. In other words, the problem of non-uniform bending resulting from gradual variations in the thickness and plastic properties of the workpiece in its lengthwise direction cannot be solved.

For effectively bending a short workpiece with a long press brake like the press brake 51 shown in FIG. 22, the so-called "step bending" method is usually taken, according to which two to four sets of bending dies are mounted so as to align in a lateral direction of the machine and the short workpiece is stepwise moved in the lateral direction to be bent. In the case of step bending, bending accuracy may deteriorate because of offset load, the inclination of the ram, or the deflections of the ram and the fixed bed. For achieving accurate bending, there are usually adopted the following methods. One is a method in which the inclination of the ram is avoided by driving the ram with two drive shafts disposed at the right and left, while compensating for the deflections of the ram and the bed with the hydraulic cylinders for use in crowning. Another bend angle correction method is to compensate for the inclination and deflections with a plurality of wedges disposed in a lateral direction of the machine.

When the ram driving method disclosed in Japanese Patent Publication Gazette No. 7-265957 is used in bending a short workpiece with a long machine driven by two drive shafts, there arises the following problem. Generally, the long machine is subjected to relatively greater deflection and has a greater distance between the position of the workpiece and a punch position corresponding to each drive shaft, compared to a short press brake. Therefore, when driving the ram with a value obtained by converting a corrective penetration amount on a workpiece position basis into a corrective amount on a punch position basis, mechanical deflection between these positions varies significantly owing to a change in load before and after punch penetration for compensation. As a result, accurate punch penetration for compensation cannot be performed.

This is further explained with reference to FIG. 23. FIG. 23(a) illustrates a case where a short workpiece W is bent with a long machine 61 and FIG. 23(b) illustrates a case where the same workpiece W is bent with a short machine 71. In these figures, solid line A represents the deflections of the beds 62, 72 and solid line B the deflections of the rams 63, 73 during bend angle measurement. Broken line A' represents the deflections of the beds 62, 72 and broken line B' the deflections of the rams 63, 73 after punch penetration for compensation. Generally, while heavy weight is objectionable for the rams (movable members) 63, 73, the beds (fixed members) 62, 72 are designed to have greater rigidity. Therefore, the relationship described by b (the deflection of the ram)>a (the deflection of the bed) holds. Where increases in the deflection of the bed and in the deflection of the ram due to punch penetration for compensation are denoted by $\Delta b$ and $\Delta a$ respectively, the relationship described by $\Delta b > \Delta a$ holds. The sum $\Delta a + \Delta b$ of the increases in the deflections of the bed and the ram in the long machine is greater than the sum $\Delta a' + \Delta b'$ of the increases in the deflections in the short machine. That is, $\Delta a + \Delta b >> \Delta a' + \Delta b'$ holds.

Conceivably, this problem may be solved by measuring, with a load measuring means, a change in load before and after punch penetration for compensation and compensating for a change in deflection. In this case, however, load is measured after punch penetration for compensation and then punch penetration is again performed in the corrective amount corresponding to the deflection change. This results in not only complicated control but also prolonged cycle time. Further, a load measuring means is required.

The present invention is directed to overcoming the foregoing problems and the primary object of the invention is therefore to provide a bend angle correction method and a press brake for use therewith, the method being capable of providing simple punch penetration to establish an accurate bend angle along the entire length of a workpiece by a combination of bend angle measurement during bending operation and a multiple shaft driving mechanism so that a desired bend can be produced with high accuracy by one bending operation without being affected by material variations.

Another object of the invention is to provide a bend angle correction method and a press brake for use therewith, the method being capable of providing simple and precise punch penetration even when bending a short workpiece with a long machine so that a desired bend can be produced with high accuracy by one bending operation without being affected by material variations.

DISCLOSURE OF THE INVENTION

According to a first aspect of the invention, the foregoing object can be accomplished by a bend angle correction method for correcting a bend angle when bending a workpiece by the cooperative movement of a movable die and a fixed die, the movable die being driven by three or more drive shafts, while the fixed die being disposed in an opposing relationship with the movable die, wherein the bend angle of the workpiece is measured during bending operation and the difference between a target bend angle and the measured bend angle is obtained at at least three points, that are, the ends and center of the workpiece, and based on these differences, a correction value for the penetration amount of the movable die associated with each shaft-load imposed point of the movable die is obtained.

According to the bend angle correction method of the invention, the bend angle of the workpiece is measured in the course of bending operation and the difference between a target bend angle and the measured bend angle is obtained, at at least three positions. These three positions are the ends and center of the workpiece. Each difference value is converted into a correction value for the penetration amount of the movable die at a "shaft-load imposed point" which is the position of the movable die where the load of each drive shaft is exerted and which corresponds to the position of each drive shaft. With this arrangement, even if the workpiece is not bent uniformly because of the plastic properties or thickness of the workpiece which varies along the length of the workpiece, a corrective penetration amount including a crowning correction value and an inclination correction value can be automatically obtained on the basis of shaft-load imposed point. Thus, bend angle correction can be easily performed and a desired bend angle can be accurately and uniformly produced throughout the entire length of the workpiece.

The method according to the first aspect of the invention can be implemented by a press brake according to a second aspect of the invention. This press brake bends a workpiece by the cooperative movement of a movable die and a fixed die, the movable die being driven by three or more drive shafts, while the fixed die being disposed in an opposing relationship with the movable die, the press brake comprising:

(a) memory means for storing workpiece bending conditions, workpiece target bend angle to springback angle relationship data and workpiece bend angle to movable die penetration amount relationship data;

(b) bend angle measuring means for measuring, during bending operation, the bend angle of the workpiece at at least three points that are located along the length of the workpiece;

(c) calculating means for calculating a provisional penetration point of the movable die associated with each drive shaft based on the workpiece bending conditions and the workpiece target bend angle to springback angle relationship data which are stored in the memory means, and for calculating a corrective penetration amount of the movable die associated with each angle measuring point, based on the bend angle of the workpiece measured by the bend angle measuring means when each provisional penetration point has been reached and based on the workpiece target bend angle to springback angle relationship data and the workpiece bend angle to movable die penetration amount relationship data which are stored in the memory means;

(d) interpolating means for obtaining, by interpolation, a final penetration point of the movable die associated with each shaft-load imposed point of the movable die, from the corrective penetration amounts calculated by the calculating means; and (e) die driving means for driving the movable die until each shaft-load imposed point of the movable die reaches its final penetration point, after driving it until each shaft-load imposed point reaches its provisional penetration point.

According to the press brake of the invention, when performing bending operation, a provisional penetration point for the movable die is calculated based on workpiece bending conditions, workpiece target bend angle to springback angle relationship data, and workpiece bend angle to movable die penetration amount relationship data, which are stored in the memory means. Then, the movable die is driven to this provisional penetration point by the die driving means and at this position, the bend angle measuring means measures the bend angle of the workpiece at at least three points on the workpiece which are located along the length of the workpiece. Based on the measured bend angles, the workpiece target bend angle to springback angle relationship data and the workpiece bend angle to movable die penetration amount relationship data, a corrective penetration amount for the movable die positioned at the provisional penetration point is obtained. From this corrective penetration amount, a final penetration point for each shaft-load imposed point of the movable die is obtained by interpolation. Thereafter, the movable die is driven to the final penetration point thus obtained, thereby completing the bending operation. With this arrangement, even if the bending position of the workpiece is laterally deviated, correct movable die penetration can be performed so as to produce an accurate target angle throughout the length of the workpiece, by making only one bend angle measurement during bending operation. In consequence, high-accuracy bending operation can be performed for a short time.

Preferably, the interpolating means calculates the final penetration point for each shaft-load imposed point, based on a crowning correction value and an inclination correction value. The crowning correction value is obtained from the deflection difference of a bed for supporting the fixed die, the deflection difference being the difference in deflection between the bed position corresponding to the center of the workpiece and a line connecting the bed positions that correspond to the ends of the workpiece. The inclination correction value is obtained from the crowning correction value and the difference in deflection between the bed positions corresponding to the ends of the workpiece.

The bend angle measuring means is so mounted as to be movable along rails in a lengthwise direction of the bed. The rails are laid on the front face and/or back face of the bed for supporting the fixed die. This enables it to accurately measure a bend angle at arbitrary positions in a lengthwise direction of the workpiece.

According to a third aspect of the invention, there is provided a bend angle correction method for correcting a bend angle when bending a short workpiece with the length of bend much shorter than the length of a bending machine, by the cooperative movement of a movable die and a fixed die, the movable die being driven by three or more drive shafts, while the fixed die being disposed in an opposing relationship with the movable die, wherein the bend angle of the workpiece is measured during bending operation and the difference between a target bend angle and the measured bend angle is obtained, at at least one point located along the length of the workpiece, and based on the difference, a correction value for the penetration amount of the movable die associated with each shaft-load imposed point of the movable die is obtained.

According to the above bend angle correction method of the invention, when bending a short workpiece with a bending length which is much shorter than the length of a bending machine, the bend angle of the workpiece is measured during bending operation and the difference between a target bend angle and the measured bend angle is obtained, at at least one position that is located in a lengthwise direction of the workpiece. This difference is converted into a correction value for the penetration amount of the movable die at each shaft-load imposed point. With this arrangement, even when a short workpiece is bent with a long press brake, error in the corrective penetration of the movable die after angle measurement can be minimized so that high-accuracy compensation can be ensured for penetration.

The method of the third aspect can be implemented by a press brake according to a forth aspect of the invention. The press brake is designed to bend a short workpiece with the length of bend much shorter than the length of the press brake, by the cooperative movement of a movable die and a fixed die, the movable die being driven by three or more drive shafts, while the fixed die being disposed in an opposing relationship with the movable die, the press brake comprising:

(a) memory means for storing workpiece bending conditions, workpiece target bend angle to springback angle relationship data and workpiece bend angle to movable die penetration amount relationship data;

(b) bend angle measuring means for measuring, during bending operation, the bend angle of the workpiece at at least one point that is located along the length of the workpiece;

(c) calculating means for calculating a provisional penetration point of the movable die associated with each drive shaft based on the workpiece bending conditions and the workpiece target bend angle to springback angle relationship data which are stored in the memory means, and for calculating a corrective penetration amount of the movable die associated with each angle measuring point, based on the bend angle of the workpiece measured by the bend angle measuring means when each provisional penetration point has been reached and based on the workpiece target bend angle to springback angle relationship data and the workpiece bend angle to movable die penetration amount relationship data which are stored in the memory means;

(d) interpolating means for obtaining, by interpolation, a final penetration point of the movable die associated with each shaft-load imposed point of the movable die, from the corrective penetration amounts calculated by the calculating means; and (e) die driving means for driving the movable die until each shaft-load imposed point of the movable die reaches its final penetration point, after driving it until each shaft-load imposed point reaches its provisional penetration point.

According to the press brake of the invention, when bending a short workpiece with a bending length which is much shorter than the length of a bending machine, a provisional penetration point for the movable die is calculated based on workpiece bending conditions, workpiece target bend angle to springback angle relationship data and workpiece bend angle to movable die penetration amount relationship data, which are stored in the memory means. Then, the movable die is driven to this provisional penetration point by the die driving means and at this position, the bend angle measuring means measures the bend angle of the workpiece at at least one measuring point on the workpiece which is located along the length of the workpiece. Based on this measured bend angle, the workpiece target bend angle to springback angle relationship data and the workpiece bend angle to movable die penetration amount relationship data, a corrective penetration amount for the movable die positioned at the provisional penetration point is obtained. From this corrective penetration amount, a final penetration point for each shaft-load imposed point of the movable die is obtained by interpolation. Thereafter, the movable die is driven to the final penetration point thus obtained, thereby completing the bending operation. With this arrangement, even when a short workpiece is bent with a long press brake by, for instance, step bending, error in the corrective penetration of the movable die after angle measurement can be minimized by making only one bend angle measurement during bending operation so that high-accuracy compensation can be ensured for penetration. In consequence, high-accuracy bending can be carried out for a short time. When the short workpiece has a bending length of, for example, about 500 mm or less, a boat-formed belly usually does not occur, but the bend angle of the workpiece may vary at its right and left ends because of material variations. Therefore, it is preferable to make a bend angle measurement at two points (at the right and left ends). When bending length is 100 mm or less, the difference between the bend angles at the right and left ends is not a problem and therefore a measurement at only one measuring point is enough. As described above, the number of measuring points is preferably determined according to bending length. The number of drive shafts and their positions may be determined by the maximum bending length achievable by the press brake. Additionally, the distance between adjacent drive shafts and the rigidity of the ram and the bed should be so determined as not to cause a boat-formed belly due to the deflection of the bed or ram between the shaft-load imposed points.

Preferably, the interpolating means calculates the final penetration point for each shaft-load imposed point, by a linear interpolation of the corrective penetration amounts of the movable die associated with the angle measuring points located at the right and left ends of the workpiece. Alternatively, the interpolating means calculates the final penetration point based on deflection curves obtained from the deflection data of the machine.

The bend angle measuring means is so mounted as to be movable along rails in a lengthwise direction of the bed. The rails are laid on the front face and/or back face of the bed for supporting the fixed die. This enables it to accurately measure a bend angle at arbitrary positions along the length of the workpiece.

BEST MODE FOR CARRYING OUT THE INVENTION

Figure 1:
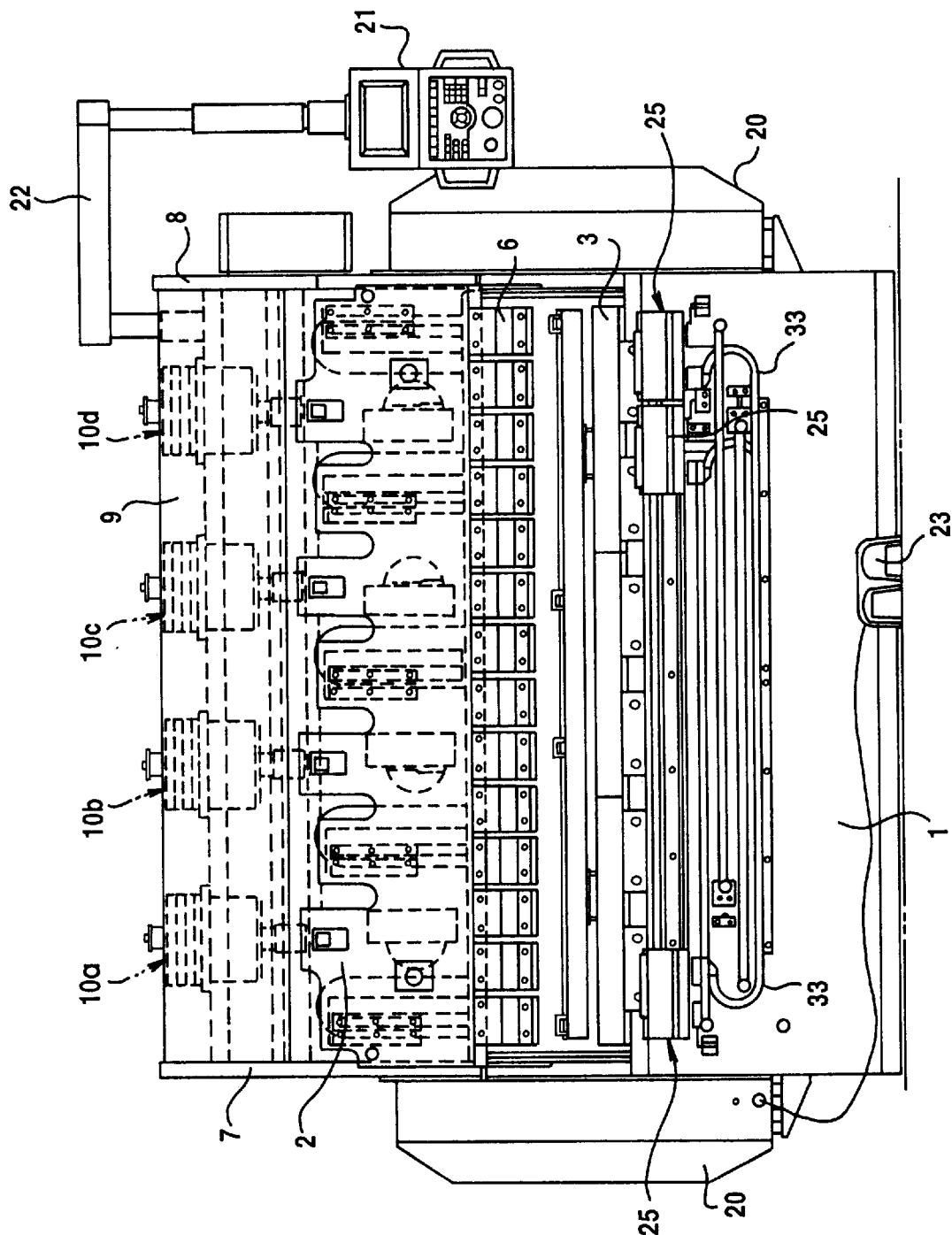
FIG. 1 is a front view of a press brake according to a first embodiment of the invention.

Referring now to the drawings, bend angle correction methods and press brakes for use therewith will be described according to the preferred embodiments of the invention.

First Embodiment

Figure 2:
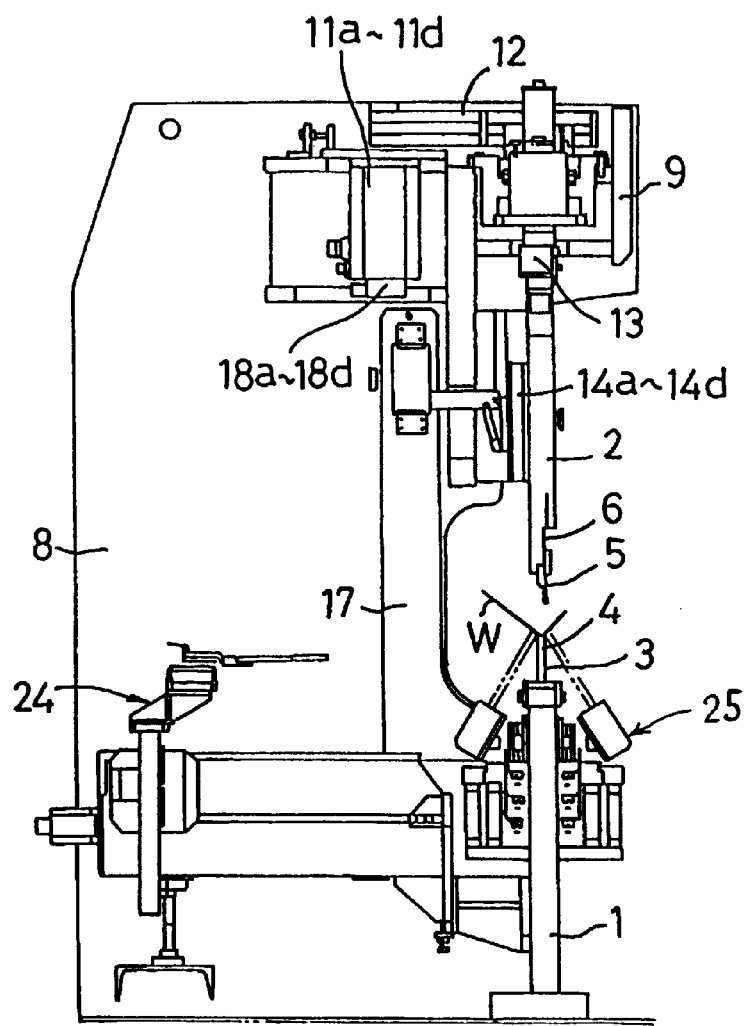
FIG. 2 is a side view of the press brake according to the first embodiment.
Figure 3:
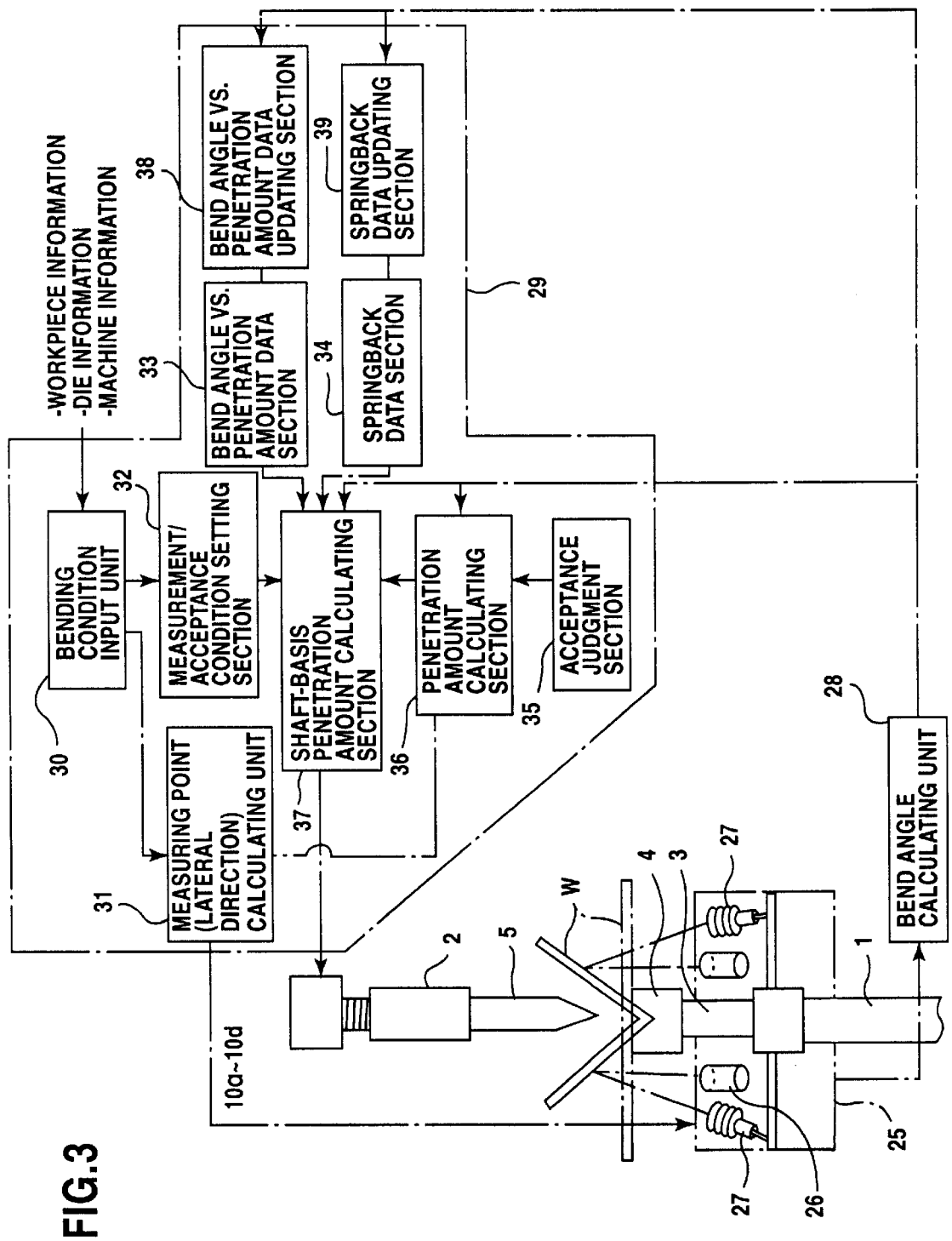
FIG. 3 is a block diagram of a control system of the press brake according to the first embodiment.

FIGS. 1 and 2 are a front view and side view, respectively, of a press brake constructed according to a first embodiment of the invention. FIG. 3 is a block diagram showing the structure of a control system incorporated in the press brake of this embodiment.

The press brake of the present embodiment comprises a fixed bed 1 and a ram 2 which is in an opposing relation with the bed 1 and driven so as to rise and lower. A die (lower die) 4 having a V-shaped groove is supported on the top of the bed 1 by means of a die holder 3, while a punch (upper die) 5 is attached to the underside of the ram 2 by a punch holder 6 so as to face the die 4.

A pair of side frames 7, 8 are disposed on the respective ends of the bed 1 in an integral fashion and a support frame 9 is disposed so as to connect the respective upper ends of the side frames 7, 8. The support frame 9 has a plurality of ram driving units (four units in this embodiment) 10a to 10d attached thereto. The ram 2 is connected to the respective lower ends of the ram driving units 10a to 10d so as to be rockable. The ram 2 is raised or lowered by the operation of the ram driving units 10a to 10d, thereby bending a workpiece W inserted between the punch 5 and the die 4.

AC servo motors 11a to 11d are disposed behind the ram driving units 10a to 10d as their driving sources. The driving forces of the AC servo motors 11a to 11d are transmitted to ball screws 13 coupled to the ram 2 through timing belts 12. The ball screws 13 convert the rotary driving forces into vertically working forces which are then imposed on the workpiece W as pressing force.

The position of the ram 2 in a vertical direction is detected by linear encoders (incremental encoders) 14a to 14d which are disposed at the positions corresponding to the positions of the drive shafts of the ram driving units 10a to 10d. The detection data of these encoders are input to an NC device 29. According to the vertical position of the ram 2 at the positions (hereinafter referred to as "shaft-load imposed points") corresponding to the respective positions of the drive shafts, the servo motors 11a to 11d are feed-back controlled through servo amplifiers (not shown) and brakes attached to the motor shafts of the servo motors 11a to 11d are controlled by a machine controller (sequencer). The linear encoders 14a to 14d are supported by a correction bracket 17 composed of two side plates positioned beside the side frames 7, 8 and a beam for connecting these right and left side plates. By virtue of this arrangement, the linear encoders 14a to 14d are unaffected by the deformation of the side frames 7, 8 due to changes in load and can measure the absolute position of the ram 2 at each shaft-load imposed point. It should be noted that encoders (absolute encoders) 18a to 18d are attached to the motor shafts of the servo motors 11a to 11d, in order to detect the respective present positions of the servo motors 11a to 11d. With the detection data of the encoders 18a to 18d, the servo amplifiers 15a to 15d are controlled.

A control unit 20, which includes an NC device 29 for controlling the ram driving units 10a to 10d and the machine controller (sequencer), is attached to the side of a main body frame of the press brake. An operation panel 21, which includes a key board for inputting bending process data etc., a display unit for displaying various data and switches, is suspended from the support frame 9 through a turnable arm 22. There is also provided a foot switch 23 operable by foot on the lower side of the main body frame.

There are three angle measuring units 25 on both of the front and back faces of the bed 1 (six measuring units 25 in total) so as to be movable along laterally extending linear guides 26. The angle measuring units 25 each comprise a slit light source 26 which projects a linear light image onto the outer face of the workpiece W subjected to bending and a CCD camera 27 for picking up this linear projected light image. The image picked up by the CCD camera 27 is processed in a bend angle calculating unit 28 to obtain the bend angle of the workpiece W. The result of the arithmetic operation is input to the NC device 29.

Bending process data such as die information (e.g., the radius of the tip of the punch, punch height, die height, die V-groove width, die V-groove angle and shoulder radius of the die V-groove), workpiece information (e.g., material, tensile strength, thickness) and bending conditions (e.g., bend angle, the length of bend, bending position eccentricity) are input to the NC device 29. There is provided a bending condition input unit 30 for inputting measuring conditions such as (i) how many degrees the angle at which a bend angle measurement is to be made is short of a target angle and (ii) how far each measuring point is from both ends of the workpiece in a lateral direction. According to the data input to the bending condition input unit 30, the location of each measuring point in a lateral direction is calculated in a measuring point calculating unit 31. Based on the result of the arithmetic operation performed by the unit 31, each angle measuring unit 25 is moved to a specified position.

The NC device 29 comprises (i) a measurement/acceptance condition setting section 32, (ii) a bend angle vs. penetration amount data section 33, (iii) a springback data section 34, (iv) an acceptance judgement section 35, (v) a penetration amount calculating section 36, (vi) a shaft-basis penetration amount calculating section (interpolation operation section) 37, (vii) a bend angle vs. penetration amount data updating section 38 and (viii) a springback data updating section 39. According to bending condition data entered from the bending condition input unit 30, the measurement/acceptance condition setting section 32 sets measuring points; data such as measurement process order and tolerance; sampling conditions (e.g., the number of sampling times and sampling angle) for updating a data base; and acceptance conditions for bend angles. The bend angle vs. penetration amount data section 33 registers data on the relationship between bend angles and movable die penetration amounts for the ram 2. The springback data unit 34 registers data on the relationship between target bend angles and springback angles. The acceptance judgement section 35 judges whether the bending accuracy of a finished workpiece is acceptable based on data sent from the bend angle calculating unit 28. The penetration amount calculating section 36 calculates a provisional movable die penetration point (lower limit) associated with each drive shaft of the ram 2 according to data from the bending condition input unit 30 and calculates a corrective movable die penetration amount associated with each measuring point, according to data from the bend angle vs. penetration amount data section 33, the springback data section 34, the bending condition input unit 30 and the bend angle calculating unit 28. The shaft-basis penetration amount calculating section 37 calculates a final movable die penetration amount associated with each shaft-load imposed point according to data from the penetration amount calculating section 36. The section 37 outputs the result of the arithmetic operation to the ram driving units 10a to 10d. The bend angle vs. penetration amount data updating section 38 temporarily stores data from the bend angle calculating unit 28, resisters new or updated data in the bend angle vs. penetration amount data section 33 and performs setting of arithmetic operation forms and calculation of coefficients. The springback data updating section 39 temporarily stores data from the bend angle calculating unit 28, resisters new or updated data in the springback data section 34 and performs setting of arithmetic operation forms and calculation of coefficients.

Figure 4:
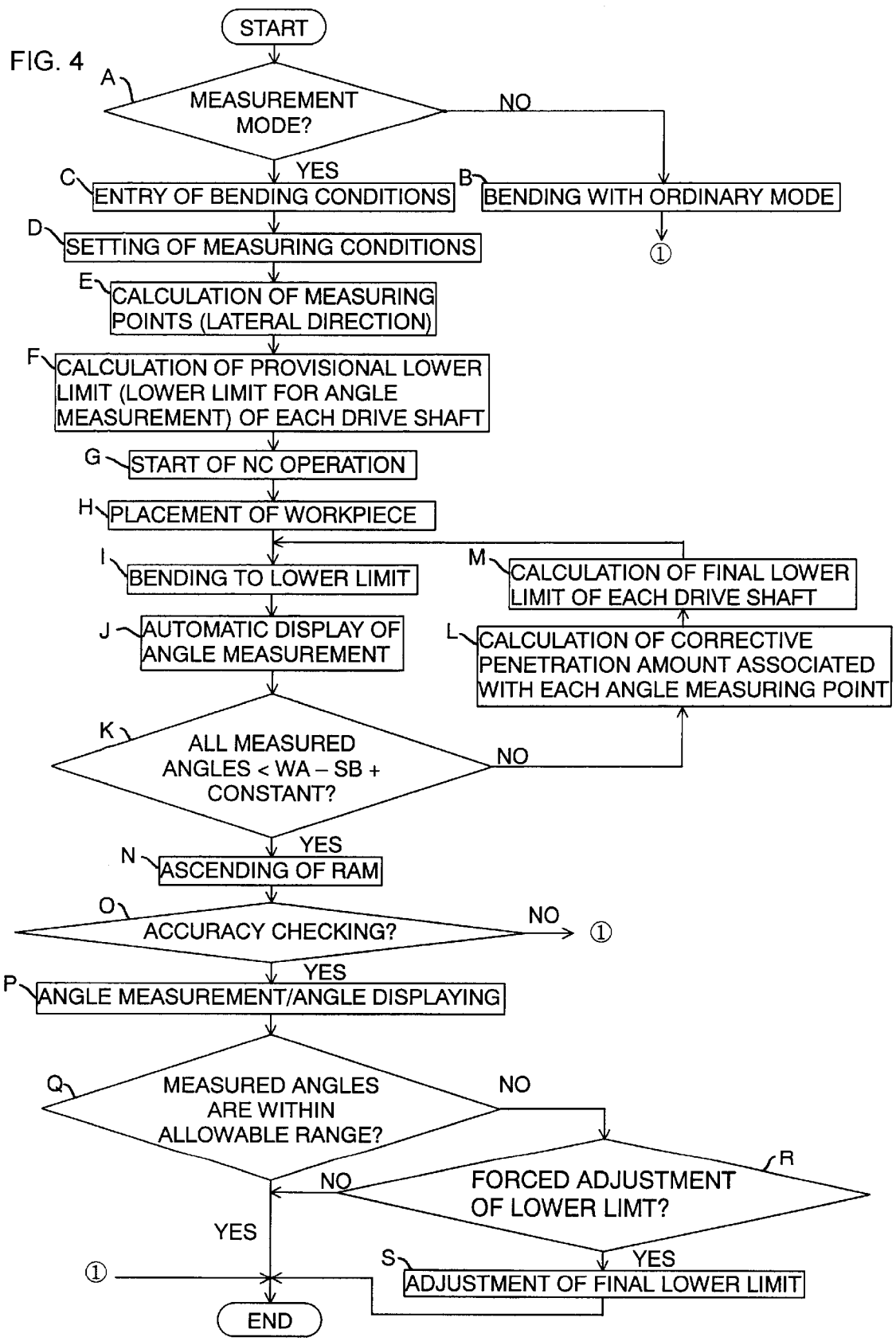
FIG. 4 is a flow chart of a bending process according to the first embodiment.

Now, reference is made to the flow chart of FIG. 4 to describe a bending process according to the present embodiment.

STEPS A to B: A judgment is made to check whether the bend angle measurement mode is selected (STEP A). If it is not selected, bending operation is performed in the ordinary mode (STEP B) and then the flow is terminated. On the other hand, if the bend angle measurement mode is selected, the program proceeds to STEP C. Whether or not bending operation is to be performed in the bend angle measurement mode is determined by depressing an external switch by the operator.

STEPS C to E: Bending conditions such as workpiece information (material, bending line length, bend angle etc.), die information (die height, V-groove width, V-groove angle, punch R etc.), and machine information (rigidity, speed specification, stroke specification etc.) are entered from the bending condition input unit 30 (STEP C). Then, the lengthwise position and set state of each bend angle measuring unit 25, which are bend angle measuring conditions, are set (STEP D). According to the bending conditions and measuring conditions, the lengthwise position of each bend angle measurement unit 25 is calculated (STEP E).

STEP F: A provisional lower limit for each drive shaft, that is, a lower limit at which a bend angle measurement is to be made is calculated. This arithmetic operation will be later described in detail with reference to the flow chart of FIG. 6.

STEPS G to J: The NC device 29 is brought into operation (STEP G). Upon the start of the operation of the NC device 29, each bend angle measurement unit 25 is moved to a position obtained by calculation. Then, the workpiece W is placed between the punch 5 and die 4 (STEP H) and the drive shafts are driven to their respective provisional lower limit positions to perform bending (STEP 1). Subsequently, an angle measurement is made by the angle measuring units 25 when the drive shafts are at these provisional lower limit positions while displaying the result of the measurement (STEP J).

Figure 5:
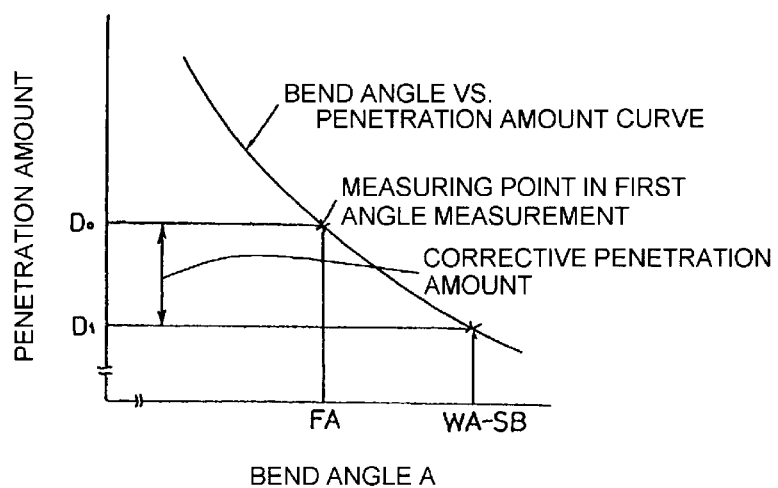
FIG. 5 is a graph showing a bend angle to penetration amount relationship.

STEPS K to L: It is then determined whether or not all the measured angles are smaller than the value A obtained by the following equation: A=target bend angle (WA)−springback angle (SB)+coefficient (herein, the coefficient is a value such as tolerance). In other words, it is determined whether the ram 2 has reached a final lower limit position. If it is determined that the final lower limit position has not been reached, a corrective punch penetration amount for each angle measuring point is calculated. As shown in FIG. 5, this corrective punch penetration amount is obtained from a bend angle vs. penetration amount curve as $(D_0-D_1)$ when the measured angle is FA. This curve is stratified according to bending conditions and registered beforehand. This calculation for obtaining a corrective punch penetration amount is performed for every angle measuring point STEP M: A final lower limit for each drive shaft is obtained by interpolation from the corrective punch penetration amount associated with each angle measuring point. The details of this interpolation will be later described with reference to the flow chart of FIG. 10.

STEPS N to P: If all the measured angles reach the value A=target bend angle (WA)−springback angle (SB)+coefficient, the ram 2 is raised (STEP N) and it is then determined whether bending accuracy is to be checked (STEP O). If the check will not be made, the flow is terminated. On the other hand, if the check will be made, a bend angle measurement is made and the measured values are displayed (STEP P). In this case, it is preferable to make an angle measurement with the workpiece W slightly clamped, in order to prevent the workpiece from falling down, resulting in a failure in angle measurement when the ram 2 is in ascending movement.

STEPS Q to S: It is determined whether the measured angles are within the allowable range (STEP Q) and if so, the flow is terminated. If the measured angles do not fall within the allowable range, the bending operation is regarded as a failure and it is then determined whether forced lower limit correction is to be made (STEP R). If so, the final lower limit is corrected (STEP S) and the flow is terminated. If not, the flow is terminated without making the correction. It should be noted that the final lower limit correction is made in such a way that a corrective punch penetration amount is obtained from the bend angle to penetration amount relationship shown in FIG. 5 and the final lower limit of each drive shaft is obtained by the interpolation described later.

Figure 6:
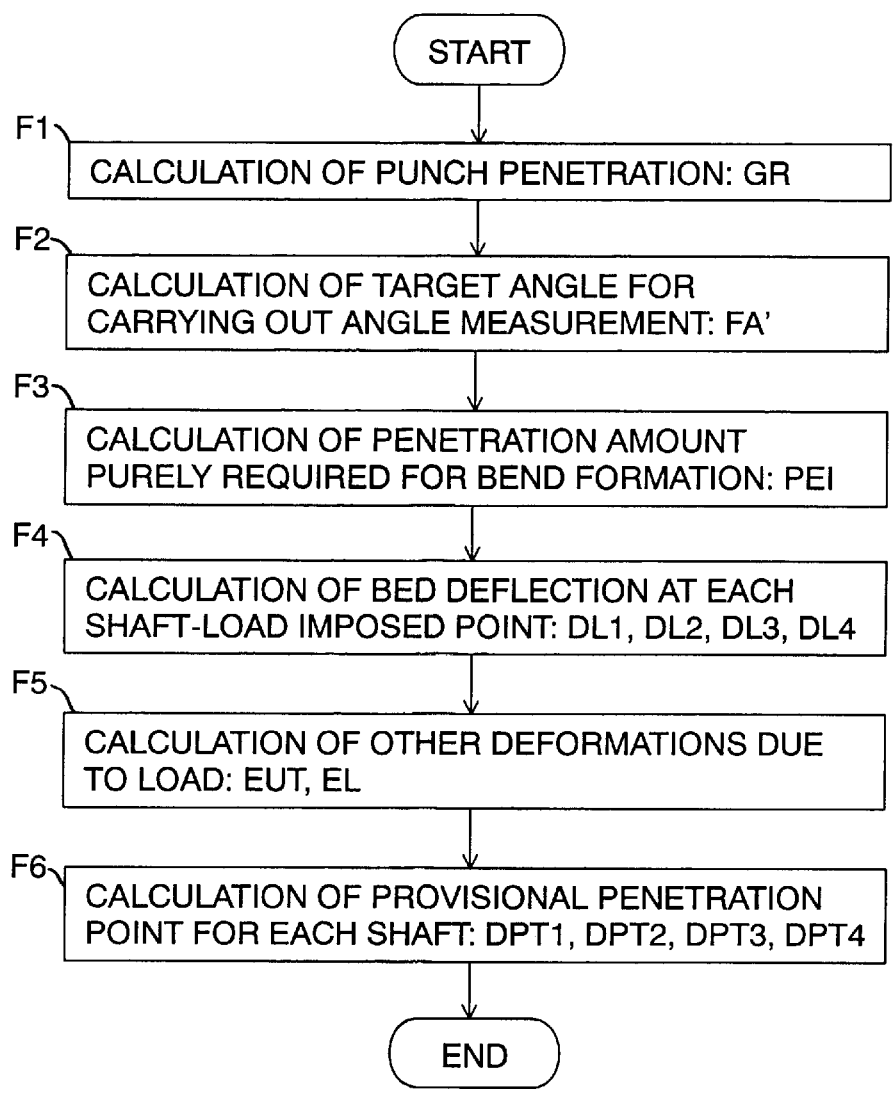
FIG. 6 is a flow chart of an operation for calculating a provisional lower limit of each drive shaft.

Turning now to FIG. 6, the process of calculating a provisional lower limit associated with each die drive shaft (i.e., STEP F in the flow chart of FIG. 4 described above) will be described.

STEP F1: First of all, the penetration amount GR of the tip of the punch is obtained according to workpiece material MAT, workpiece thickness WT, finished product target angle WA, springback angle SB, inner bending radius FR during formation, punch tip radius PR, die V-groove width DV, die V-groove angle DA, and die V-shoulder radius DR. These data are input bending process data associated with formability factors. The punch tip penetration amount GR is unitarily obtained from the following equation, based on workpiece material MAT, workpiece thickness WT, finished product target angle WA, punch tip radius PR and die V-groove width DV.

$$GR = f(MAT, WT, WA, PR, DV)$$

It should be noted the function f is determined beforehand by experiments or simulations.

STEP F2: A target bend angle FA' for carrying out angle measurement is calculated. This target bend angle FA' is given by the following equation.

$$FA' = WA - SB + AA$$

In this equation, AA represents how many degrees the angle at which a bend angle measurement is made is short of the target bend angle.

Figure 7:
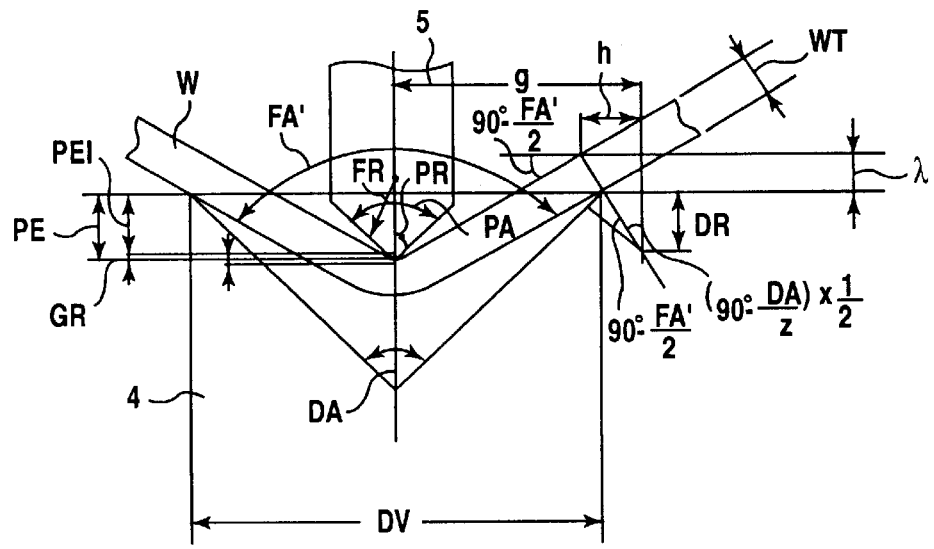
FIG. 7 is a diagram showing the geometrical relationship between a die, a workpiece and a punch in air bending.

F3: A punch penetration amount PEI (see FIG. 7: the amount PEI is the penetration of the punch purely required for forming a bend) is calculated from the following equation.

$$PEI = (g-h) \times \tan(90° - FA'/2) - i - j$$

In this equation, g, h, i and j are defined as follows.
$g = DV/2 + DR \times \tan(90° - DA/2)/2$
$h = (DR+WT) \times \sin(90° - FA'/2)$
$i = (DR+WT) \times \cos(90° - FA'/2) - DR$
$j = FR \times (1/\cos(90° - FA'/2) - 1)$ Therefore, the punch penetration amount PE depending on formability factors is calculated from:

$$PE = PEI + GR$$

Figure 8:
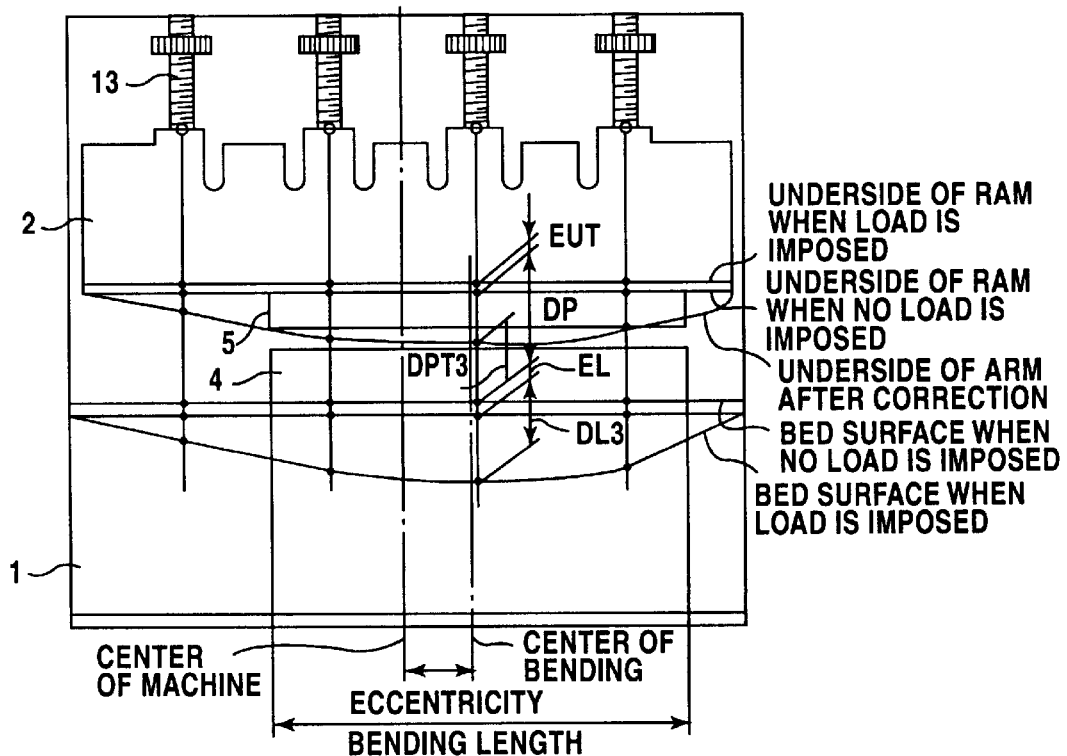
FIG. 8 diagrammatically illustrates the deformed configuration of each part.

STEPS F4 to F5: To obtain the punch penetration amount PE inclusive of mechanical factors, the deformed state of each member is modeled as shown in FIG. 8, and a lower limit position is obtained in the following way, taking into account the mechanical deformation occurring when load is exerted. Concretely, data on punch height PH, die height DH, workpiece bending length WL and workpiece bending position WPP are input through the bending condition input unit 30, in addition to the above-mentioned formability factors. According to the data, the displacement EUT of the ram 2 due to load, the displacement EL of the bed 1 due to load and a deflection amount DLi (i=1, 2, 3, 4) at each shaft-load imposed point of the bed 1 are obtained. Of these mechanical factors, the displacement EUT of the ram 2 and the displacement EL of the bed 1 due to load are particularly important.

A bed deflection amount DLi is obtained by multiplying a bending deflection amount YBi and a shearing deflection amount YSi at each shaft-load imposed point by a differential coefficient DLCOR experimentally obtained. Note that these deflection amounts YBi and YSi are values obtained when equally distributed load is imposed on the end supporting beam. The bending deflection amount YBi and shearing deflection amount YSi are obtained in the following way.

Figure 9:
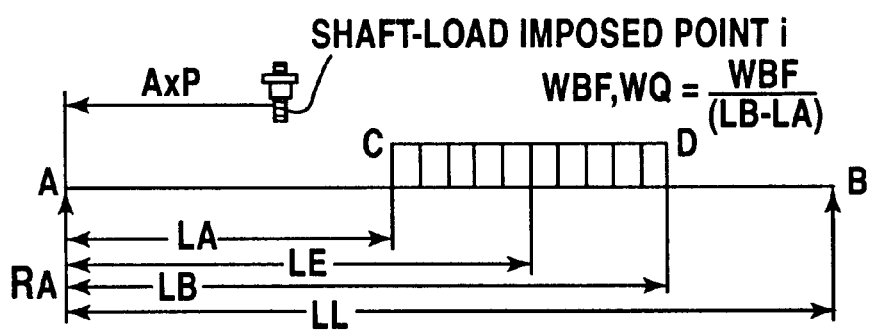
FIG. 9 diagrammatically illustrates an equation used for calculating the deflection of a bed.

Suppose that the distance from the point A to a shaft-load imposed point is represented by AXP as shown in FIG. 9.

(1) Where the shaft-load imposed point is positioned between the point A and the point C ($0 \leq AXP < LA$):

$$YB = -(RA/6 \times AXP^3 + C1 \times AXP)/(E \times I)$$

$$YS = K \times RA \times AXP/(G \times A)$$

(2) Where the shaft-load imposed point is positioned between the point C and the point D (LA≦AXP <LB):

$$YB=-(RA/6 \times AXP^3-WQ/24 \times (AXP-LA)^4+C1 \times AXP)/(E \times I)$$

$$YS=(RA \times AXP-WQ/2 \times (AXP-LA)) \times K/(G \times A)$$

(3) Where the shaft-load imposed point is positioned between the point D and the point B (LB≦AXP<LL):

$$YB=-(RA/6 \times AXP^3-WBF/6 \times (AXP-LE)^3+C5 \times AXP+C6)/(E \times I)$$

$$YS=(RA \times AXP-WBF \times (AXP-LE)^2 \times K/(G \times A)$$

Accordingly, the deflection amount DLi at the shaft-load imposed point i, which is experimentally obtained, is calculated from the following equation.

$$DLi=(YB+YS) \times DLCOR$$

where YB is a bending deflection amount; Ys is a shearing deflection amount; E is a vertical elastic modulus; G is a lateral elastic modulus; I is geometrical moment of inertia; A is cross sectional area: RA is a reaction force at the point A; WQ is load per unit length; WBF is total load; C1, C5 and C6 are constants; and K is a shearing stress rate.

The constants C1, C5 and C6 are given by the following equations.

$$C1=(ZZ+C5 \times (LB-LL))/LB$$

$$C5=(WBF/2 \times (LB-LE)^2-WBF/6 \times (LB-LA)^2+ZZ/LB) \times LB/LL$$

$$C6=WBF/6 \times (LL-LE)^3-RA/6 \times LL^3-C5 \times LL$$

It should be noted that $ZZ=WBF/24 \times (LB-LA)^3-WBF/6 \times (LB-LE)^3+WBF/6 \times (LL-LE)^3-RA/6 \times LL^3$.

The differential coefficient DLCOR of the deflection of the bed 1, the displacement EUT of the ram 2, the displacement EL of the bed 1 can be readily obtained from an empirical formula which is unitarily determined by bending conditions given by experiments or simulations.

STEP F6: Thus, a lower limit DPTi for each drive shaft is calculated. In the case shown in FIG. 8, a target value DPT3 for the third shaft-load imposed point is described by the following equation.

$$DPT3=PH+DH-PE-EUT-EL-DL3$$

Likewise, the lower limits associated with the first, second and forth shafts are arithmetically calculated.

Figure 10:
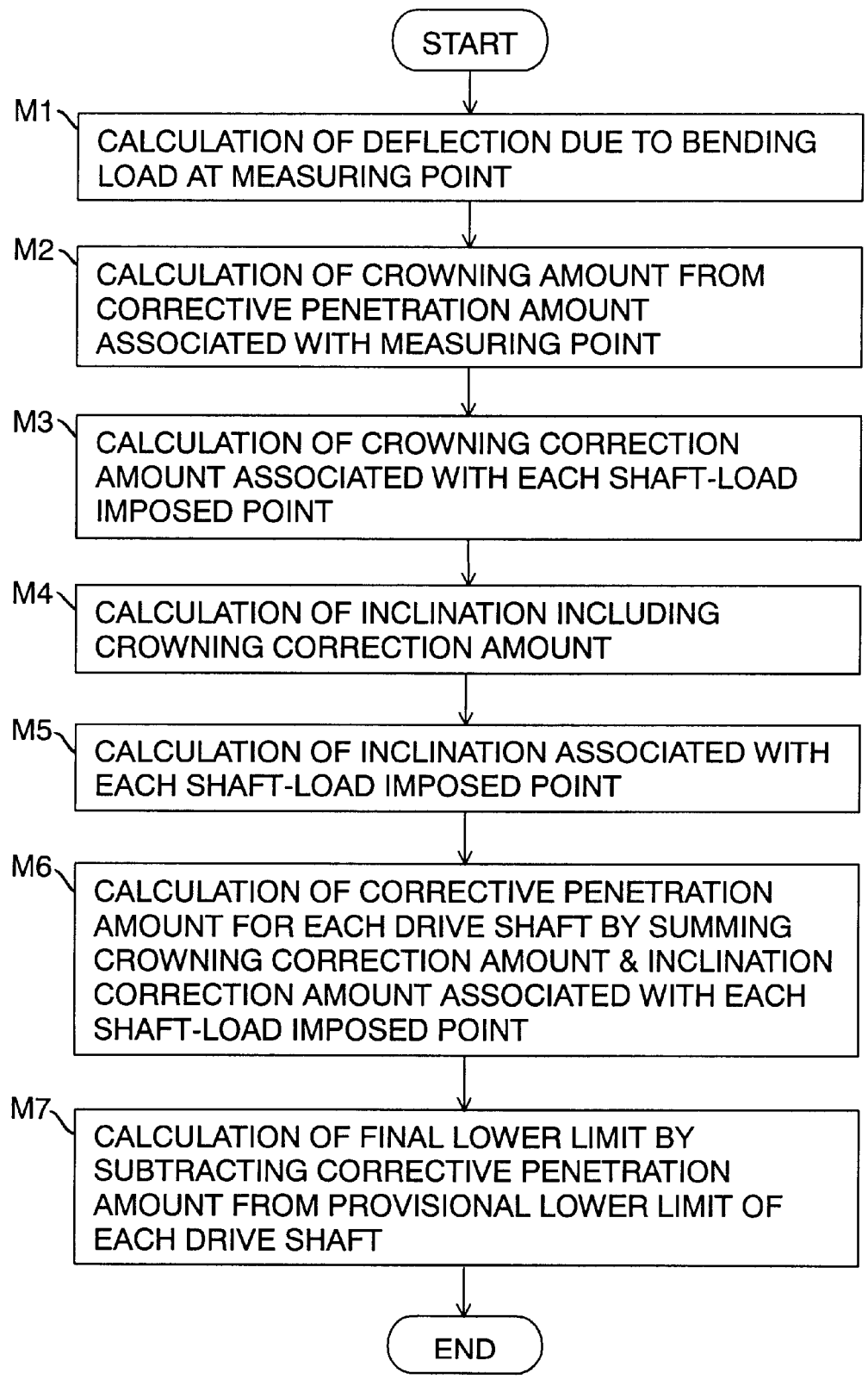
FIG. 10 is a flow chart of a process for interpolating a final lower limit of each drive shaft.

Reference is made to FIG. 10 to describe STEP M of the flow chart of FIG. 4, that is, a process for calculating a final lower limit for each die drive shaft by interpolation.

STEP M1: The deflection amount of the bed at each measuring point is obtained based on the bending load BF which has been obtained at the time of the calculation of a provisional lower limit (see FIG. 11). For example, the deflection amount CWXC of the bed at the position corresponding to the center of the workpiece is obtained by the following calculation. A deflection amount YB due to bending at the center of the workpiece is described by:

$$YB=-(RA/6 \times WPXC^3+C1 \times WPXC)/(E \times I^2).$$

A deflection amount YS due to shearing force at the center of the workpiece is described by:

$$YS=(RA \times WPXC-WQ/2 \times (WPXC-LA)^2) \times K/(G \times A).$$

Therefore, the bed deflection amount CWXC is given by:

$$CWXC=YB+YS=-(RA/6 \times WPXC^3+C1 \times WPXC)/(E \times I_z)+(RA \times WPXC-WQ/2 \times (WPXC-LA)^2) \times K/(G \times A)$$

where WQ is bending load per unit length;
RA is a reaction force at the left end of the bed;
$I_z$ is a geometrical moment of inertia;
E is a vertical elastic modulus;
G is a lateral elastic modulus; and
K, A, C1 are other constants.

Similarly, a bed deflection amount CWXL at the position corresponding to the left end of the workpiece and a bed deflection amount CWXR at the position corresponding to the right end of the workpiece are obtained. Herein, the target bend angle FA' for driving to the provisional lower limit is proximate to the target bend angle (WA−SB) for final punch penetration and therefore the bending load difference between them is negligible.

Figure 12:
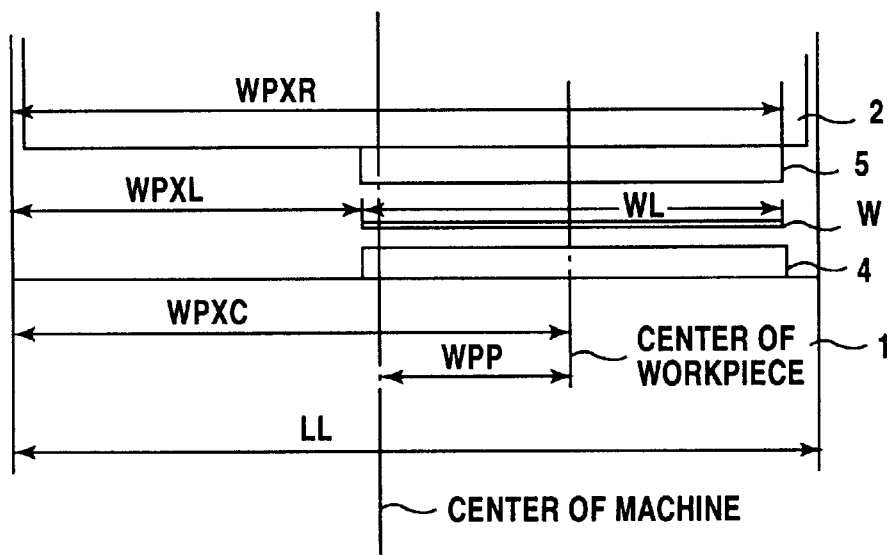
FIG. 12 diagrammatically illustrates the content of an arithmetic operation for calculating a measuring point.

The positions of the measuring points are obtained by calculating the respective distances from the left end of the bed 1 to the workpiece ends and to the workpiece center (see FIG. 12). Where the distance between the bed supporting points is LL, the eccentricity of the bending position is WPP and the bending length of the workpiece is WL, the positions of these measuring points are calculated by the following equations.

(1) The center of the workpiece $$WPXC=LL/2+WPP$$

(2) The left end of the workpiece $$WPXL=WPXC-WL/2$$

(3) The right end of the workpiece $$WPXR=WPXC+WL/2$$

Figure 13:
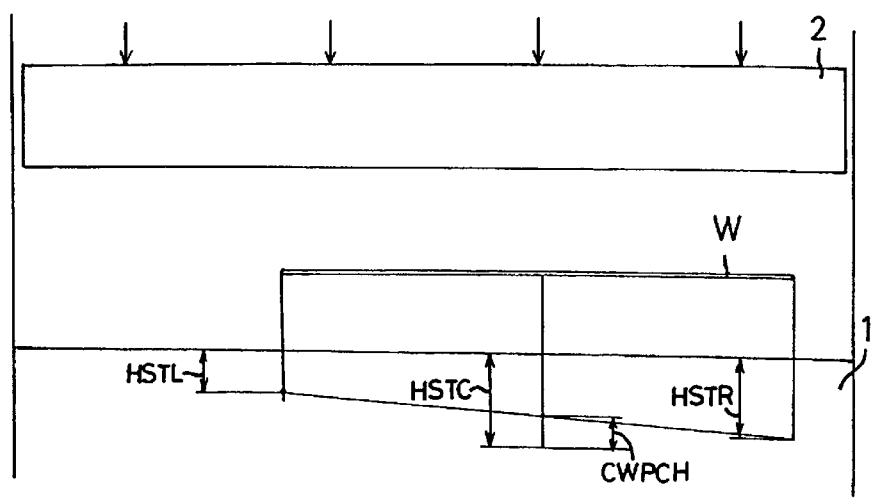
FIG. 13 diagrammatically illustrates the content of an arithmetic operation for calculating a crowning amount from correction amounts.

STEP M2: According to the corrective penetration amounts described above, the difference CWPCH between the corrective penetration amount HSTC associated with the center of the workpiece and the line connecting the corrective penetration amount HSTL associated with the left end of the workpiece and the corrective penetration amount HSTR associated with the right end of the workpiece is obtained, using the following equation (see FIG. 13). Herein, HSTL, HSTR, HSTC are corrective punch penetration amounts at the angle measuring points.

$$CWPCH=HSTC-(WPXC-WPXL) \times (HSTR-HSTL)/(WPXR-WPXL)-HSTL$$

Figure 11:
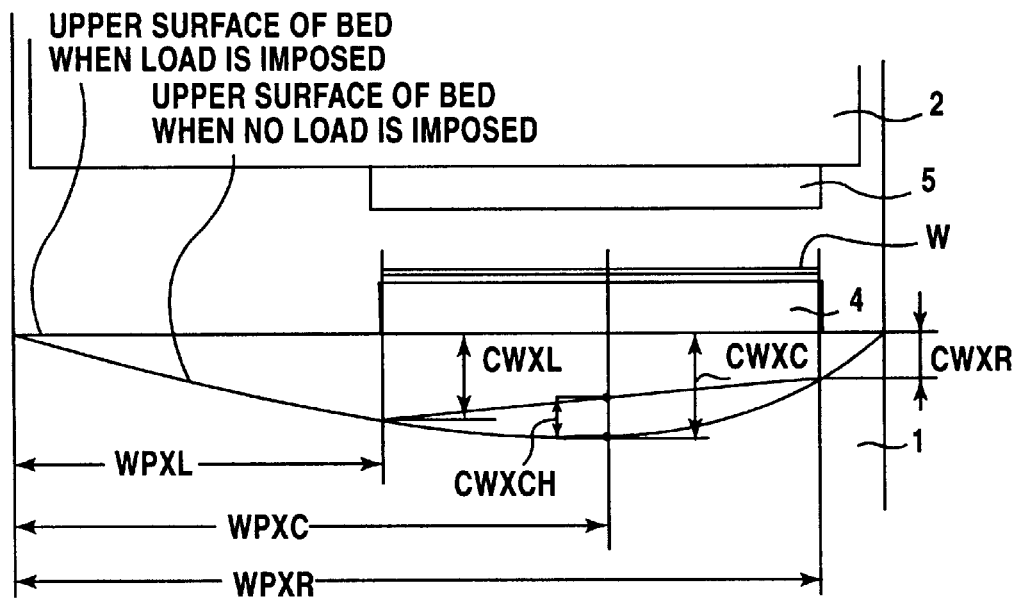
FIG. 11 diagrammatically illustrates the content of an arithmetic operation for calculating a bed deflection amount.

According to the bed deflection amounts at the measuring points which have been calculated from the bending load, the difference CWXCH between the bed deflection amount CWXC at the center of the workpiece and the bed deflection amounts CWXL, CWXR associated with the left and right ends of the workpiece is obtained, as described by the following equation (see FIG. 11).

$$CWXCH=CWXC-(WPXC-WPXL) \times (CXWXR-CWXL)/(WPXR-WPXL)-CWXL$$

Figure 14:
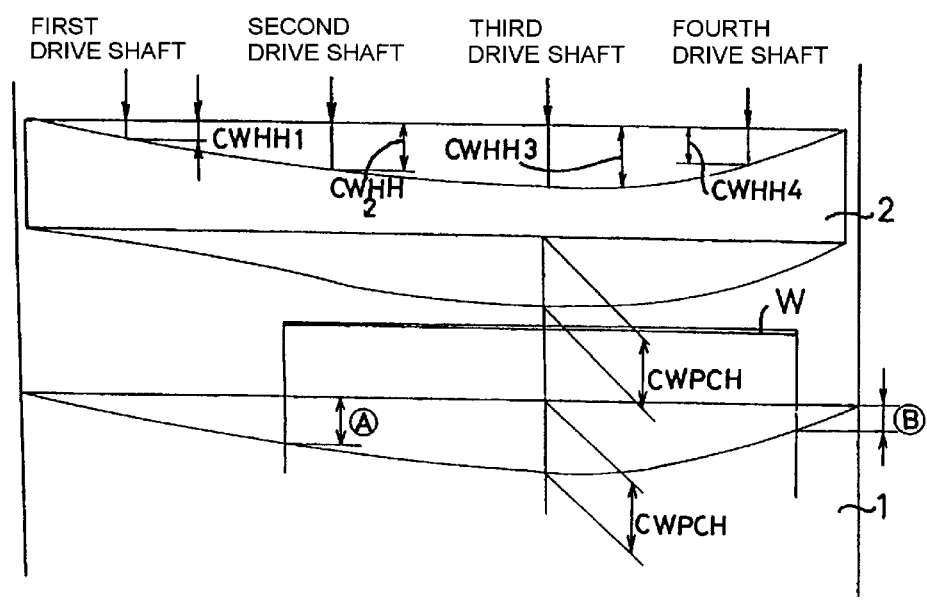
FIG. 14 diagrammatically illustrates the content of an arithmetic operation for calculating a crowning correction amount for each shaft-load imposed point.

STEP M3: Based on the bed deflection amounts due to the bending load at the center of the bed and at the shaft-load imposed points, which have been calculated at the time of the calculation of the target position, the ratio between CWPCH and CWXCH obtained in STEP M2 is converted into a crowning correction value for each shaft-load imposed point (see FIG. 14). For instance, a crowning correction amount CWHH1 for the first shaft-load imposed point is represented by CWHH1=DL1×CWPCH/CWXCH−CWHHL where the bed deflection amount due to the bending load at the first shaft-load imposed point is designated by DL1.

Herein, CWHHL is a correction coefficient which indicates that a correction value is obtained on the basis of the measuring point on the left end of the workpiece and is calculated from the following equation.

$$CWHHL=CWXL\times CWPCH/CWXCH$$

Correction amounts associated with other drive shafts are obtained in the similar way. The generalized equation is as follows.

$$CWHHi=DLi\times CWPCH/CWXCH-CWHHL$$

(i=1,2,3,4)

Figure 15:
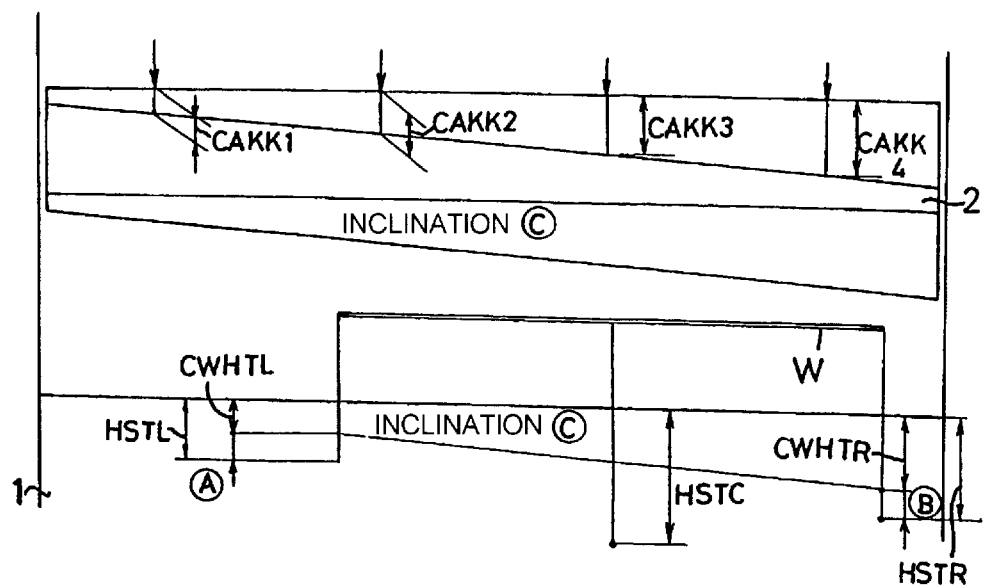
FIG. 15 diagrammatically illustrates the content of an arithmetic operation for calculating an inclination amount including a crowning correction amount and an inclination correction amount for each shaft-load imposed point.

STEP M4: A correction value associated with each end of the workpiece from which its corresponding crowning correction value has been subtracted is calculated by the following equations, thereby obtaining an inclination amount inclusive of the crowning correction amount (see FIG. 15).

$$CWHTL=HSTL-CWXL\times CWPCH/CWXCH$$

$$CWHTR=HDTR-CWXR\times CWPCH/CWXCH$$

STEP M5: An inclination amount CAKKi for each shaft-load imposed point is obtained from the following equation based on the result of the arithmetic operation performed in STEP M4 (see FIG. 15).

$$CAKKi=(APPi-APP1)\times(CWHTR-CWHTL)/(WPXR-WPXL)-CAKKL$$

(i=1,2,3,4)

CAKKL is a correction coefficient which indicates that a correction value is obtained on the basis of the measuring point on the left end of the workpiece and is calculated from the following equation.

$$CAKKL=(WPXL-APP1)\times(CWHTR-CWHTL)/(WPXR-WPXL)-CAKKL$$

In this way, an inclination correction amount for each shaft-load imposed point can be obtained.

Figure 16:
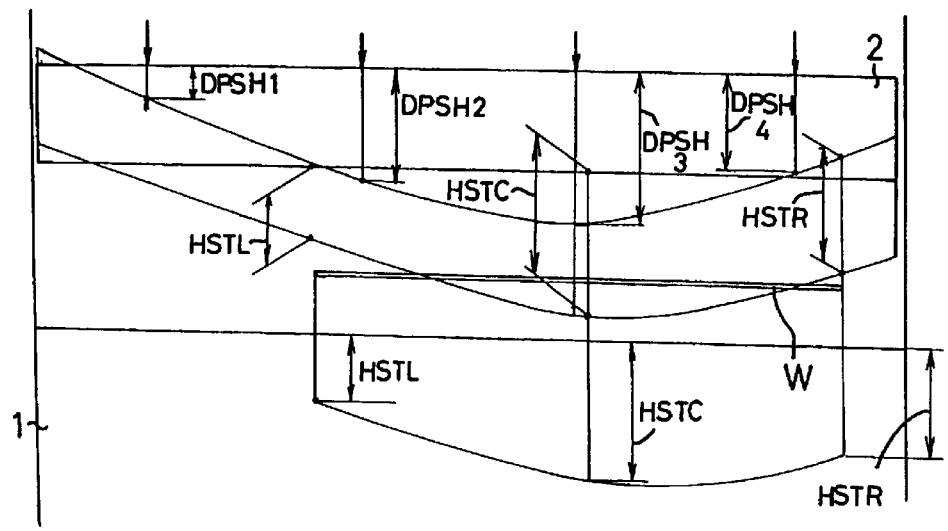
FIG. 16 diagrammatically illustrates the content of an arithmetic operation for calculating a correction amount for each shaft-load imposed point.

STEP M6: To obtain a corrective punch penetration amount for each shaft-load imposed point, the crowning correction amount obtained in STEP M3 and the inclination correction amount obtained in STEP M5 are summed and the correction amount HSTL for the position corresponding to the left end of the workpiece is added to the sum (see FIG. 16). This is described by the following equation.

$$DPSHi=HSTL+CWHHi+CAKKi$$

(i=1, 2, 3, 4)

STEP M7: The corrective punch penetration amount is subtracted from the provisional lower limit of each drive shaft as described by the following equation to obtain the final lower limit DPTLi. The reason why subtraction is performed is that the final lower limit DPTLi is based on the lower end.

$$DPTLi=DPTi-DPSHi$$

(i=1, 2, 3, 4)

According to the first embodiment, even if the bending position is laterally off-centered, a correction value including a crowning correction value and an inclination correction value is automatically calculated during bending operation by making only one angle measurement. Therefore, bend angle correction can be easily performed and uniform high-accuracy bending can be carried out throughout the entire length of a workpiece for a short time.

Figure 17:
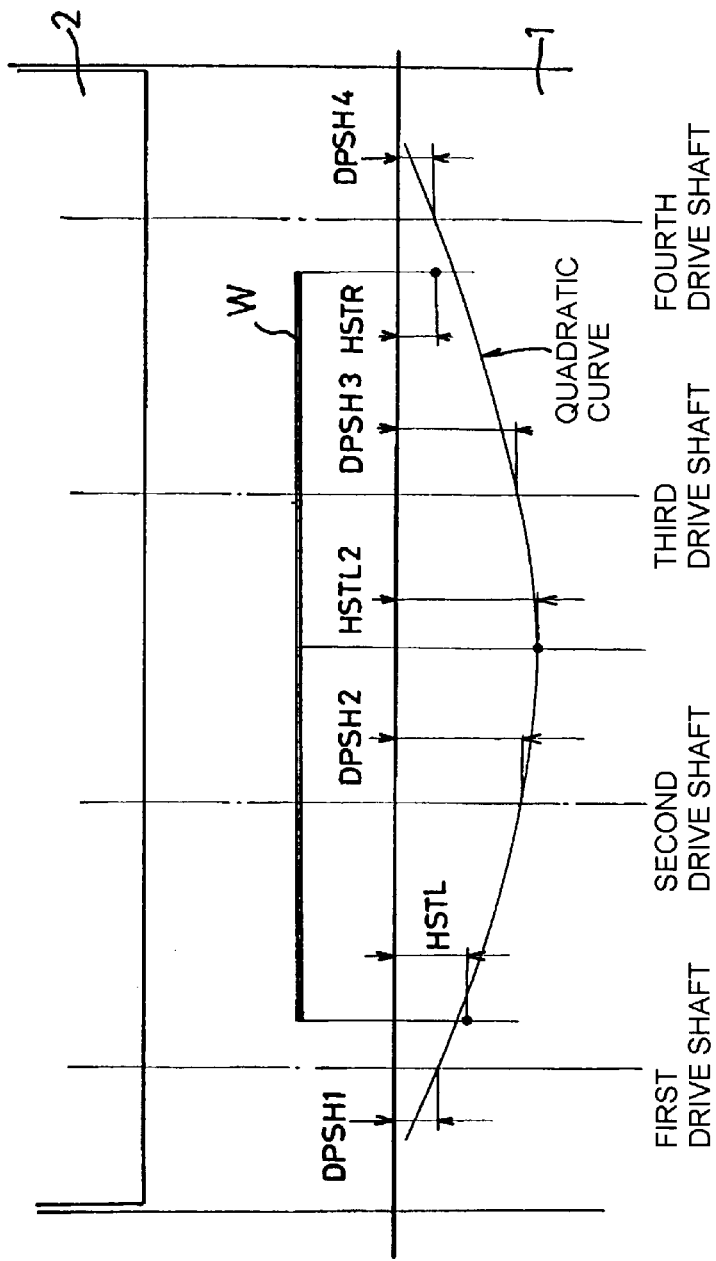
FIG. 17 illustrates another example of interpolation for obtaining a final lower limit.

In the first embodiment, a final lower limit is obtained by interpolation based on the deflection curves of the machine. However, it is possible to obtain HSTL, HSTR and HSTC by interpolation with a quadratic curve as shown in FIG. 17 or by linear interpolation with a straight line.

While the press brake of the first embodiment comprises six angle measuring units, and more specifically three units on each side of the bed, there may be provided one or two angle measuring units on each side. In this case, the angle measuring units are movable in the lengthwise direction of the workpiece like the first embodiment, so that measurement can be made at three points of the workpiece. In cases where angle measurements can be made on only one side of the outer face of the bent workpiece owing to some conditions, the result of the measurements carried out on the measurable side is doubled thereby obtaining a final bend angle.

For correction, an angle measurement is made at three points that are the right end, left end and center of the workpiece in the present embodiment. The correction may be carried out by measuring a bend angle at four or more distinctly specified measuring points. In this case, the correction amounts are obtained similarly to the case where a measurement is made at three points. Specifically, a crowning correction amount is obtained, by calculating the difference, on a correction amount basis, between the line which connects the points associated with the right and left ends of the workpiece and each measuring point positioned between these end points. An inclination amount is obtained from the correction amounts associated with the right and left ends and an overall angle correction amount is obtained from the correction amount associated with the left end.

Second Embodiment

Figure 18:
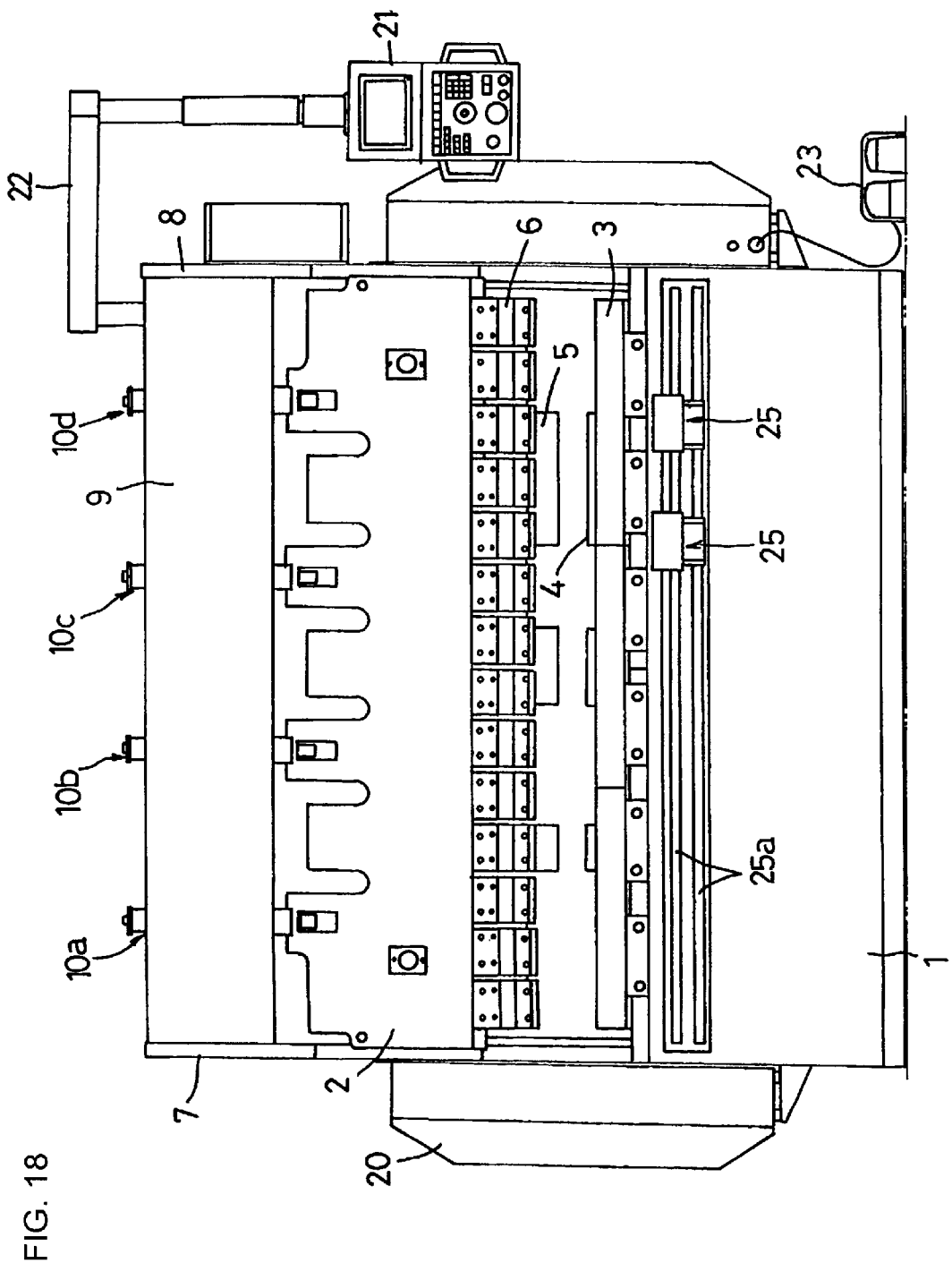
FIG. 18 is a front view of a press brake according to a second embodiment of the invention.

FIG. 18 shows a front view of the press brake constructed according to a second embodiment of the invention. This embodiment is applied to cases where a short workpiece is bent with a bending length which is much shorter than the length of the bending machine. There are two pairs of angle measuring units 25. They are disposed so as to be movable along a linear guide 25a. The press brake of the second embodiment does not differ in structure from the first embodiment except the above point. Therefore, a detailed description on the functions and parts identical to the first embodiment will be omitted.

Figure 19:
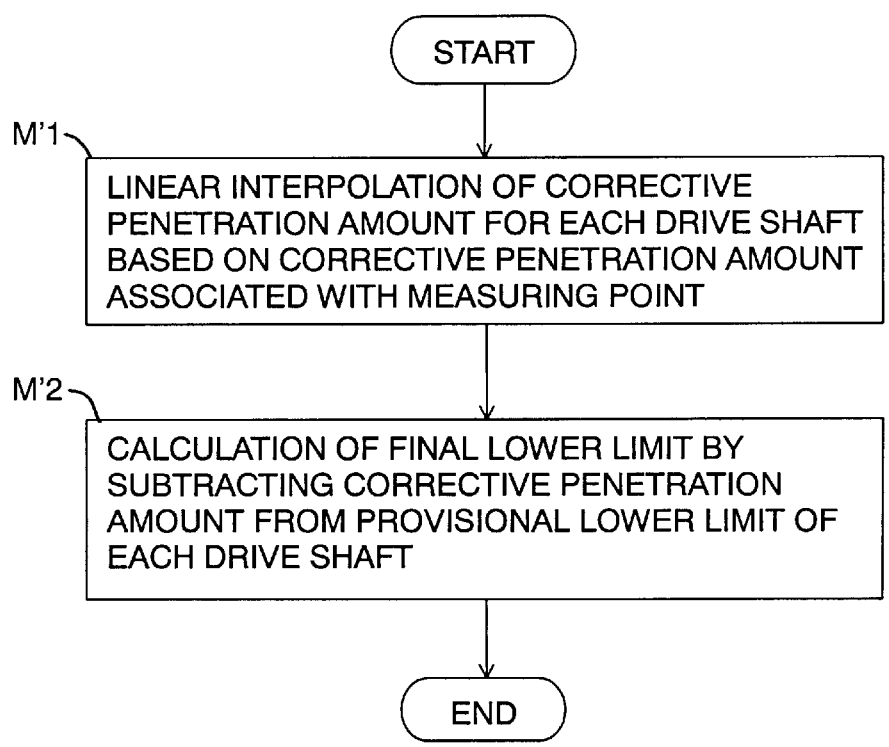
FIG. 19 is a flow chart of an interpolation process for obtaining a final lower limit of each drive shaft according to the second embodiment.

In this embodiment, Step M of the flow chart shown in FIG. 4, which is the step for obtaining the final lower limit of each drive shaft by interpolation, is executed according to the procedure shown in FIG. 19.

Figure 20:
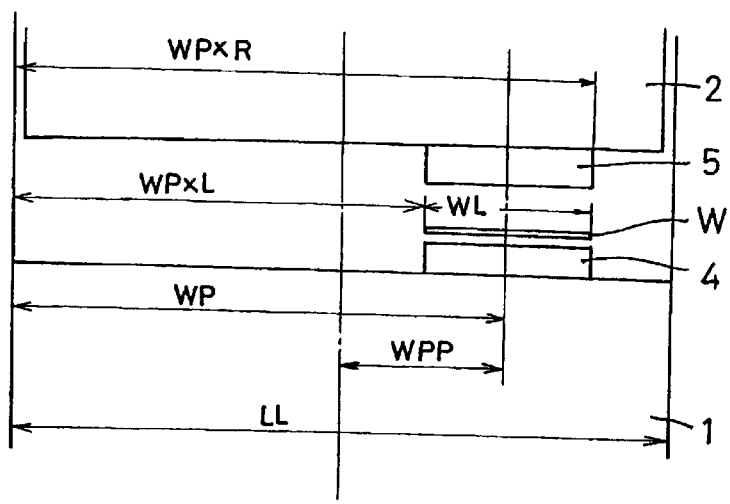
FIG. 20 diagrammatically illustrates the content of an arithmetic operation for obtaining a bed deflection amount according to the second embodiment.
Figure 21:
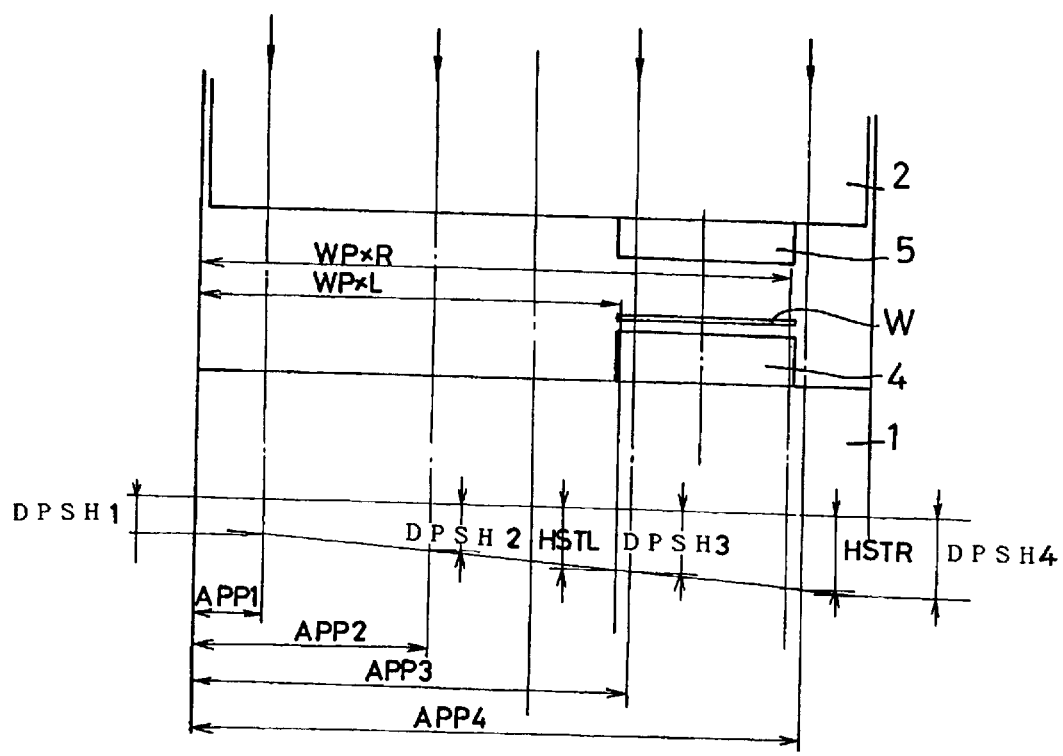
FIG. 21 diagrammatically illustrates the content of an arithmetic operation for obtaining a correction amount for a shaft-load imposed point according to the second embodiment.
Figure 22:
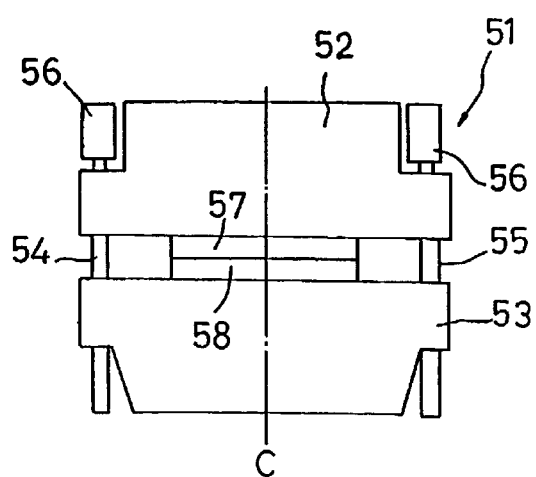
FIG. 22 is a view of a prior art press brake.
Figure 23:
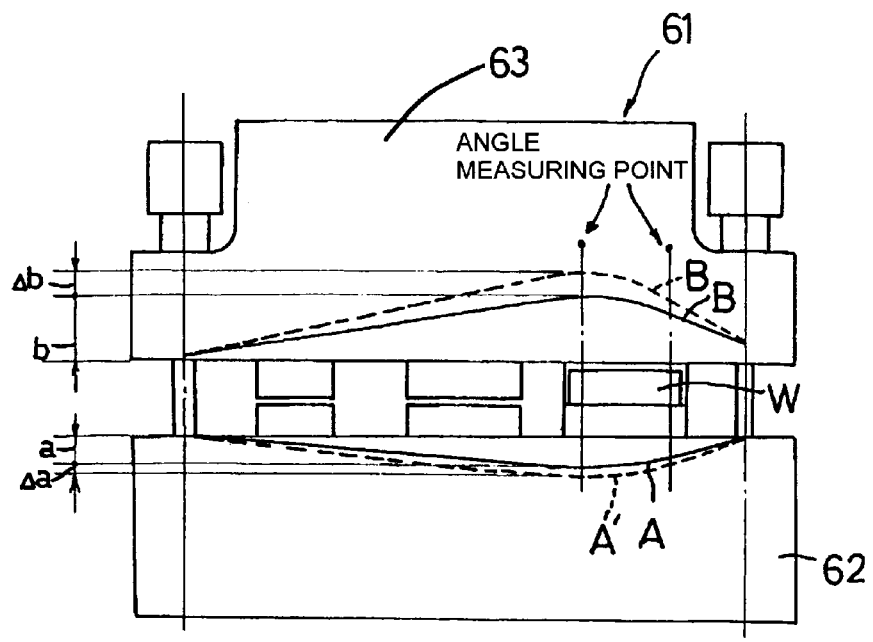
FIGS. 23(a) and 23(b) show, for comparison purpose, the states of a short workpiece when bent by a long machine and when bent by a short machine.
Figure 23:
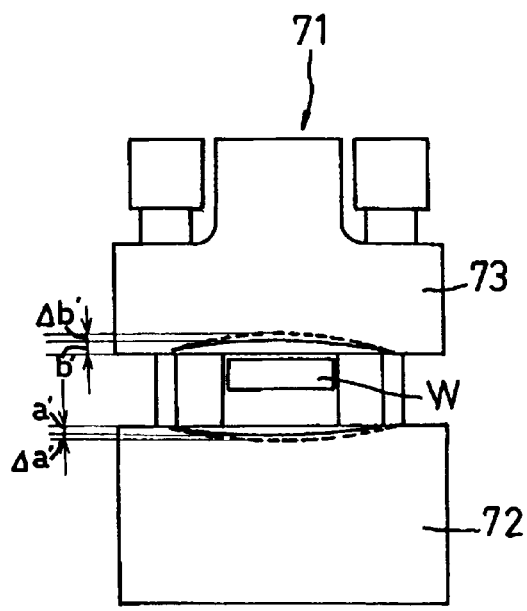

STEP M'1: As shown in FIGS. 20 and 21, a corrective penetration amount DPSHi associated with each shaft-load interposed point is obtained from the corrective penetration amounts HSTL, HSTR for the measuring points at the right and left ends of the workpiece W, by linear interpolation using the following equation.

$$DPSHi=HSTL-(WPXL-APPi)\times(HSTR-HSTL)/(WPXR-WPXL)$$

(i=1,2,3,4)

STEP M'2: The corrective penetration amount is subtracted from the provisional lower limit of each drive shaft as described by the following equation to obtain the final lower limit DPTLi. The reason why subtraction is performed is that the final lower limit DPTLi is based on the lower end.

$$DPTLi=DPTi-DPSHi$$

(i=1, 2, 3, 4)

According to the second embodiment, even when bending a short workpiece with a long press brake by, for example, step bending, a bend angle measurement can be made during bending operation and based on measured bend angles, corrective punch penetration can be carried out with the ram driving units 10a to 10d having three or more drive shafts thereby to complete bending operation. With this arrangement, error in corrective punch penetration can be minimized and high-accuracy bending operation can be performed for a short time.

In the second embodiment, a bend angle measurement is made at two points on the right end and left end of the workpiece. However, where the bending length of the workpiece is short (for instance, 100 mm or less), a bend angle measurement may be made at one point that is the center of the workpiece. In this case, the final lower limit associated with each shaft-load imposed point is obtained from the corrective penetration amount HSTC, using the following equation.

$$DPTLi=DPTi-HSTC$$

(i=1, 2, 3, 4)

While the second embodiment has been described with a concept wherein two angle measuring units are disposed on each side of the bed (four units in total), there may be provided one angle measuring unit on each side. In this case, the angle measuring units are movable in the lengthwise direction of the workpiece like the second embodiment and a measurement may be made at one or two points of the workpiece. In cases where angle measurements can be made on only one side of the outer face of the bent workpiece owing to some conditions, the result of the measurements carried out on the measurable side is doubled thereby obtaining a final bend angle.

In the first and second embodiments, each angle measuring unit comprises a slit light source and a CCD camera. In place of such a type, angle measuring units of other contact types or electrostatic capacity types may be used.

While each of the driving sources for the ram includes an AC servo motor and ball screw in the first and second embodiments, driving sources including a hydraulic unit and cylinders may be employed.

The first and second embodiments have been described with four ram drive shafts, it is readily apparent that the invention can be applied to machines having three drive shafts or five or more drive shafts.

What is claimed is:

1. A bend angle correction method for correcting a bend angle when bending a workpiece by the cooperative movement of a movable die and a fixed die, the movable die being driven at shaft-load imposed points, for penetration, by three or more drive shafts, and the fixed die being disposed in an opposing relationship with the movable die, comprising:

(a) providing memory means, and storing in said memory means workpiece bending conditions, workpiece target bend angle to springback angle relationship data and workpiece bend angle to movable die penetration amount relationship data;

(b) providing measuring means and measuring the bend angle of the workpiece during bending operation and obtaining the difference between a target bend angle and the measured bend angle at at least three points, that are, each end and a center of the workpiece;

(c) providing calculating means, and calculating with said calculating means, a provisional penetration point of the movable die associated with each drive shaft, based on the workpiece bending conditions and the workpiece target bend angle to springback angle relationship data which are stored in the memory means, and calculating a corrective penetration amount of the movable die associated with each angle measuring point, based on the bend angle of the work piece measured by the bend angle measuring means when each provisional penetration point has been reached and based on the workpiece target bend angle to springback angle relationship data and the workpiece bend angle to movable die penetration amount relationship data which are stored in the memory means;

(d) providing interpolating means and obtaining, by interpolation, a final penetration point of the movable die associated with each shaft-load imposed point of the movable die, from the corrective penetration amounts calculated by the calculating means; and (e) driving the movable die, with use of the die driving means, until each shaft-load imposed point of the movable die reaches its final penetration point, after driving it until each shaft-load imposed point reaches its provisional penetration point.

2. A press brake for bending a workpiece by the cooperative movement of a movable die and a fixed die, the movable die being driven at shaft-load imposed points, for penetration, by three or more drive shafts, and the fixed die being disposed in an opposing relationship with the movable die, the press brake comprising:

(a) memory means for storing workpiece bending conditions, workpiece target bend angle to springback angle relationship data and workpiece bend angle to movable die penetration amount relationship data;

(b) bend angle measuring means for measuring, during bending operation, the bend angle of the workpiece at at least three points that are located along the length of the workpiece;

(c) calculating means for calculating a provisional penetration point of the movable die associated with each drive shaft based on the workpiece bending conditions and the workpiece target bend angle to springback angle relationship data which are stored in the memory means, and for calculating a corrective penetration amount of the movable die associated with each angle measuring point, based on the bend angle of the workpiece measured by the bend angle measuring means when each provisional penetration point has been reached and based on the workpiece target bend angle to springback angle relationship data and the workpiece bend angle to movable die penetration amount relationship data which are stored in the memory means;

(d) interpolating means for obtaining, by interpolation, a final penetration point of the movable die associated with each shaft-load imposed point of the movable die, from the corrective penetration amounts calculated by the calculating means; and (e) die driving means for driving the movable die until each shaft-load imposed point of the movable die reaches its final penetration point, after driving it until each shaft-load imposed point reaches its provisional penetration point.

3. A press brake according to claim 2, wherein said interpolating means calculates the final penetration point associated with each shaft-load imposed point, based on a crowning correction value and an inclination correction value, said crowning correction value being obtained from a deflection difference of a bed for supporting the fixed die, the deflection difference being the difference in deflection between the bed position corresponding to a center of the workpiece and a line connecting bed positions that correspond to ends of the workpiece, said inclination correction value being obtained from the crowning correction value and the difference in deflection between the bed positions corresponding to the ends of the workpiece.

4. A press brake according to claim 3, wherein said bend angle measuring means is so mounted as to be movable along rails in a lengthwise direction of the bed, said rails being laid on a front face and/or a back face of the bed for supporting the fixed die.

5. A bend angle correction method for correcting a bend angle when bending a short workpiece with the length of bend much shorter than the length of a bending machine, by the cooperative movement of a movable die and a fixed die, the movable die being driven at shaft-load imposed points, for penetration, by three or more drive shafts, and the fixed die being disposed in an opposing relationship with the movable die, comprising (a) providing memory means, and storing in said memory means, workpiece bending conditions, workpiece target bend angle to springback angle relationship data and workpiece bend angle to movable die penetration amount relationship data;

(b) providing measuring means and measuring the bend angle of the workpiece during bending operation and obtaining the difference between a target bend angle and the measured bend angle, at at least one point located along the length of the workpiece;

(c) providing calculating means, and calculating with said calculating means, a provisional penetration point of the movable die associated with each drive shaft, based on the workpiece bending conditions and the workpiece target bend angle to springback angle relationship data which are stored in the memory means, and calculating a corrective penetration amount of the movable die associated with each angle measuring point, based on the bend angle of the workpiece measured by the bend angle measuring means when each provisional penetration point has been reached and based on the workpiece target bend angle to springback angle relationship data and the workpiece bend angle to movable die penetration amount relationship data which are stored in the memory means;

(d) providing interpolating means, and obtaining by interpolation, a final penetration point of the movable die associated with each shaft-load imposed point of the movable die, from the corrective penetration amounts calculated by the calculating means; and (e) driving the movable die, with use of the die driving means, until each shaft-load imposed point of the movable die reaches its final penetration point, after driving it until each shaft-load imposed point reaches its provisional penetration point.

6. A press brake for bending a short workpiece with the length of bend much shorter than the length of the press brake, by the cooperative movement of a movable die and a fixed die, the movable die being driven at shaft-load imposed points, for penetration, by three or more drive shafts, and the fixed die being disposed in an opposing relationship with the movable die, the press brake comprising:

(a) memory means for storing workpiece bending conditions, workpiece target bend angle to springback angle relationship data and workpiece bend angle to movable die penetration amount relationship data;

(b) bend angle measuring means for measuring, during bending operation, the bend angle of the workpiece at at least one point that is located along the length of the workpiece;

(c) calculating means for calculating a provisional penetration point of the movable die associated with each drive shaft based on the workpiece bending conditions and the workpiece target bend angle to springback angle relationship data which are stored in the memory means, and for calculating a corrective penetration amount of the movable die associated with each angle measuring point, based on the bend angle of the workpiece measured by the bend angle measuring means when each provisional penetration point has been reached and based on the workpiece target bend angle to springback angle relationship data and the workpiece bend angle to movable die penetration amount relationship data which are stored in the memory means;

(d) interpolating means for obtaining, by interpolation, a final penetration point of the movable die associated with each shaft-load imposed point of the movable die, from the corrective penetration amounts calculated by the calculating means; and (e) die driving means for driving the movable die until each shaft-load imposed point of the movable die reaches its final penetration point, after driving it until each shaft-load imposed point reaches its provisional penetration point.

7. A press brake according to claim 6, wherein said interpolating means calculates the final penetration point for each shaft-load imposed point, by linear interpolation of the corrective penetration amounts of the movable die associated with the angle measuring points located at ends of the workpiece.

8. A press brake according to claim 6 or 7, wherein said bend angle measuring means is so mounted as to be movable along rails in a lengthwise direction of a bed for supporting the fixed die, said rails being laid on a front face and/or a back face of the bed for supporting the fixed die.

* * * * *